United States Patent
Ehrenberg et al.

(10) Patent No.: US 9,283,518 B2
(45) Date of Patent: Mar. 15, 2016

(54) FLUID TREATMENT SYSTEMS AND METHODS USING SELECTIVE TRANSFER MEMBRANES

(75) Inventors: Scott G. Ehrenberg, Port Richey, FL (US); Brian Johnson, Land O'Lakes, FL (US); Hung Huynh, Port Richey, FL (US)

(73) Assignee: Dais Analytic Corporation, Odessa, FL (US)

( * ) Notice: Subject to any disclaimer, the term of this patent is extended or adjusted under 35 U.S.C. 154(b) by 377 days.

(21) Appl. No.: 13/819,190

(22) PCT Filed: Sep. 7, 2011

(86) PCT No.: PCT/US2011/050678
§ 371 (c)(1),
(2), (4) Date: Jun. 18, 2013

(87) PCT Pub. No.: WO2012/033827
PCT Pub. Date: Mar. 15, 2012

(65) Prior Publication Data
US 2013/0298766 A1    Nov. 14, 2013

Related U.S. Application Data

(60) Provisional application No. 61/380,520, filed on Sep. 7, 2010.

(51) Int. Cl.
*B01D 53/22* (2006.01)
*B01D 53/26* (2006.01)
*F24F 5/00* (2006.01)
(Continued)

(52) U.S. Cl.
CPC ............ *B01D 53/268* (2013.01); *F24F 5/0014* (2013.01); *F24F 2003/144* (2013.01); *F24F 2003/1435* (2013.01); *F28D 21/0015* (2013.01)

(58) Field of Classification Search
CPC .................. F24F 2003/1435; F24F 2003/144; F24F 5/0014; F28D 21/0015; B01D 53/268
See application file for complete search history.

(56) References Cited

U.S. PATENT DOCUMENTS 5,468,574 A    11/1995  Ehrenberg et al.
5,677,074 A    10/1997  Serpico et al.
(Continued)

FOREIGN PATENT DOCUMENTS

JP      2004/286262 A      10/2004
WO    WO 2005/030812 A1     4/2005
(Continued)

OTHER PUBLICATIONS

Machine Translation JP 2004-286262 Oct. 14, 2004 Suzuki 45 pages.*

(Continued)

*Primary Examiner* — Jason M Greene
*Assistant Examiner* — Anthony Shumate
(74) *Attorney, Agent, or Firm* — Mueting, Raasch & Gebhardt, P.A.

(57) ABSTRACT

Systems and methods for cooling and/or separating a component from a fluid are disclosed herein. Such systems and methods can include one or more of a separator (e.g., a dehumidifier), a chiller, and/or an expirator, each of which can include a selective transfer membrane. Such systems and methods can be used for a wide variety of applications including, for example, cooling and/or dehumidifying air.

23 Claims, 13 Drawing Sheets

(51) Int. Cl.
*F24F 3/14* (2006.01)
*F28D 21/00* (2006.01)

(56) References Cited

U.S. PATENT DOCUMENTS

| | | | |
|---|---|---|---|
| 5,679,482 A | 10/1997 | Ehrenberg et al. | |
| 5,946,931 A * | 9/1999 | Lomax et al. | 62/304 |
| 6,110,616 A | 8/2000 | Sheikh-Ali et al. | |
| 6,306,419 B1 | 10/2001 | Vachon et al. | |
| 6,383,391 B1 | 5/2002 | Ehrenberg et al. | |
| 6,413,298 B1 | 7/2002 | Wnek et al. | |
| 6,841,601 B2 | 1/2005 | Serpico et al. | |
| 7,179,860 B2 | 2/2007 | Cao et al. | |
| 7,582,702 B2 | 9/2009 | Wright et al. | |
| 7,585,916 B2 | 9/2009 | Wright et al. | |
| 7,592,390 B2 | 9/2009 | Bening et al. | |
| 7,625,979 B2 | 12/2009 | Atwood et al. | |
| 7,737,224 B2 | 6/2010 | Willis et al. | |
| 7,847,022 B2 | 12/2010 | Wright et al. | |
| 7,887,926 B2 | 2/2011 | Ober et al. | |
| 7,919,565 B2 | 4/2011 | Willis et al. | |
| 7,977,432 B2 | 7/2011 | Bening et al. | |
| 7,981,970 B2 | 7/2011 | Willis et al. | |
| 7,990,679 B2 | 8/2011 | Ehrenberg et al. | |
| 8,222,346 B2 | 7/2012 | Cao et al. | |
| 8,470,071 B2 | 6/2013 | Ehrenberg et al. | |
| 8,500,960 B2 | 8/2013 | Ehrenberg et al. | |
| 8,586,637 B2 | 11/2013 | Vachon et al. | |
| 8,950,205 B2 * | 2/2015 | Matracea et al. | 62/171 |
| 2003/0106680 A1 | 6/2003 | Serpico et al. | |
| 2003/0209028 A1 | 11/2003 | Piao et al. | |
| 2004/0142910 A1 | 7/2004 | Vachon et al. | |
| 2006/0156761 A1 * | 7/2006 | Mola et al. | 65/333 |
| 2006/0292208 A1 | 12/2006 | Vachon | |
| 2008/0000243 A1 | 1/2008 | Yoshimi | |
| 2008/0034966 A1 * | 2/2008 | Kesten et al. | 95/52 |
| 2008/0156465 A1 * | 7/2008 | Weidmann | 165/138 |
| 2010/0170776 A1 * | 7/2010 | Ehrenberg et al. | 202/168 |
| 2010/0273901 A1 | 10/2010 | Ehrenberg et al. | |
| 2011/0185752 A1 * | 8/2011 | Holzner et al. | 62/93 |
| 2012/0320497 A1 | 12/2012 | Ehrenberg | |
| 2013/0165538 A1 | 6/2013 | Ehrenberg et al. | |
| 2013/0199220 A1 * | 8/2013 | Ma et al. | 62/91 |
| 2013/0338244 A9 | 12/2013 | Ehrenberg et al. | |
| 2014/0035540 A1 | 2/2014 | Ehrenberg | |
| 2014/0054004 A1 * | 2/2014 | LePoudre et al. | 165/67 |
| 2014/0157985 A1 * | 6/2014 | Scovazzo et al. | 95/52 |
| 2014/0223947 A1 * | 8/2014 | Ranjan et al. | 62/271 |
| 2014/0238057 A1 * | 8/2014 | Kandil et al. | 62/94 |
| 2014/0245772 A1 * | 9/2014 | Gerlach et al. | 62/271 |

FOREIGN PATENT DOCUMENTS

| | | |
|---|---|---|
| WO | WO 2008/039779 A2 | 4/2008 |
| WO | WO 2008/089484 A1 | 7/2008 |
| WO | WO 2008/141179 A1 | 11/2008 |
| WO | WO 2009/002984 A2 | 12/2008 |
| WO | WO 2009/054234 A1 | 4/2009 |

OTHER PUBLICATIONS

International Preliminary Report on Patentability for PCT Appln. No. PCT/US2011/050678, Mar. 21, 2013; 10 pgs.
International Search Report and Written Opinion for PCT Appln. No. PCT/US2011/050678, Jan. 30, 2012; 12 pgs.
Murphy, "Smart Dedicated Outdoor Air Systems," ASHRAE *Journal*, Jul. 2006; 48(7):30-37.

* cited by examiner

FLUID TREATMENT SYSTEMS AND METHODS USING SELECTIVE TRANSFER MEMBRANES

This application is the §371 U.S. National Stage of International Application No. PCT/US2011/050678, filed 7 Sep. 2011, which claims the benefit of U.S. Provisional Application No. 61/380,520, filed Sep. 7, 2010, which are incorporated herein by reference in their entireties.

BACKGROUND

The vast majority of heat pumps and refrigeration systems today employ variations on the vapor-compression thermodynamic cycle. This approach changes the pressure of an inert working fluid to manipulate its associated saturation temperature, which allows for the transfer of sensible heat across a metal surface as the fluid changes phase. This technology is mature and has been heavily developed, but there remain several limitations. For example, many of the most efficient refrigerants have undesirable effects on the atmosphere such as depletion of the ozone layer by chlorofluorocarbon (CFC) and hydrochlorofluorocarbon (HCFC) refrigerants. Although hydrofluorocarbon (HFC) refrigerants do not deplete the ozone layer, they have significant direct global warming potentials (GWP). Even though refrigerants are nominally contained within a closed system, current industry practices added the equivalent of 144.9 metric tons of $CO_2$ to the atmosphere in 2007 through the release of these high Global Warming Potential (GWP) gases. Further, the use of sensible heat transfer across the walls which isolate the refrigerant tend to require sub-cooling below the saturation temperature of the moist air to decrease its water content through condensation, a requirement that limits the possible thermodynamic efficiency of the process.

Thus, there is a continuing need for improved air conditioning and refrigeration systems.

SUMMARY

In one aspect, the present disclosure provides a method for independently cooling and dehumidifying air. In one embodiment, this method includes: providing a flow of humid air through a dehumidifier to provide separated water vapor and a flow of dehumidified air, wherein the dehumidifier includes a first selective transfer membrane configured for an inflow of the humid air adjacent a first surface of the first membrane under conditions sufficient to allow water vapor to be transported through the first membrane to a second surface of the first membrane to provide the separated water vapor adjacent the second surface of the first membrane and an outflow of the dehumidified air adjacent the first surface of the first membrane; providing a flow of warm air through a cooler to provide a flow of cooled air, wherein the cooler includes a heat exchanger for cooling using a cooled aqueous liquid and configured for an inflow of warm air flowing through the exchanger, resulting in warmed liquid and an outflow of the cooled air, and wherein the heat exchanger is configured for flowing the warmed liquid to a chiller, wherein the chiller includes a second selective transfer membrane configured for an inflow of the warmed liquid adjacent a first surface of the second membrane under conditions sufficient to allow water vapor to be transported through the second membrane to a second surface of the second membrane to provide the separated water vapor adjacent the second surface of the second membrane and an outflow of the chilled liquid adjacent the first surface of the second membrane; and pressurizing the separated water vapor for removal through an expirator, wherein the expirator includes a third selective transfer membrane configured for flowing the separated water vapor adjacent a first surface of the third membrane under conditions sufficient to allow at least a portion of the water vapor to be transported through the third membrane to a second surface of the third membrane.

In certain embodiments, the above described method for independently cooling and dehumidifying air can further include a method for replenishing water in the aqueous liquid used in the heat exchanger by transferring water from a second aqueous liquid using a fourth selective transfer membrane, wherein the concentration of water in the second aqueous liquid adjacent a first surface of the fourth membrane is sufficiently higher than the concentration of water in the heat exchanger aqueous liquid adjacent a second surface of the fourth membrane to cause forward osmosis of water from the first surface of the fourth membrane to the second surface of the fourth membrane while substantially limiting the transfer of other components of the second aqueous liquid adjacent the first surface of the fourth membrane to the second surface of the fourth membrane, thereby increasing the concentration of water in the heat exchanger aqueous liquid adjacent the second surface of the fourth membrane. In some embodiments, the difference in water concentration between the first and second surfaces of the fourth membrane results from a thermal gradient that increases the partial pressure of the water. Thermal gradients can be induced, for example, by capturing environmental temperature differences using, for example, solar heat sources, geothermal heat, and/or waste heat rejection. Optionally, the second aqueous liquid can further include additives such as antifreeze. Optionally, the second aqueous liquid can further include dissolved salts and/or minerals. Such methods for replenishing water can be used as desired in other systems and methods described herein.

In another embodiment, the present disclosure provides a system for independently cooling and dehumidifying air. In one embodiment, this system includes: a dehumidifier configured to provide a flow of humid air through the dehumidifier to provide separated water vapor and a flow of the dehumidified air, wherein the dehumidifier includes a first selective transfer membrane configured for an inflow of the humid air adjacent a first surface of the first membrane to allow water vapor to be transported through the first membrane to a second surface of the first membrane to provide the separated water vapor adjacent the second surface of the first membrane and an outflow of the dehumidified air adjacent the first surface of the first membrane; a cooler configured to provide a flow of warm air through the cooler to provide a flow of cooled air, wherein the cooler includes a heat exchanger for cooling using a cooled aqueous liquid and configured for an inflow of warm air flowing through the exchanger, resulting in warmed liquid and an outflow of the cooled air, and wherein the heat exchanger is configured for flowing the warmed liquid to a chiller, wherein the chiller includes a second selective transfer membrane configured for an inflow of the warmed liquid adjacent a first surface of the second membrane to allow water vapor to be transported through the second membrane to a second surface of the second membrane to provide the separated water vapor adjacent the second surface of the second membrane and an outflow of the chilled liquid adjacent the first surface of the second membrane; and an expirator configured to pressurize and remove the separated water vapor through the expirator, wherein the expirator includes a third selective transfer membrane configured for flowing the separated water vapor adjacent a first surface of the third membrane to allow at least a portion of the water vapor to be transported through the third membrane to a second surface of the third membrane.

In another aspect, the present disclosure provides a method for dehumidifying air. In one embodiment, this method includes: providing a flow of humid air through a dehumidifier to provide a flow of dehumidified air and separated water vapor, wherein the dehumidifier includes a first selective transfer membrane configured for an inflow of the humid air adjacent a first surface of the first membrane under conditions sufficient to allow water vapor to be transported through the first membrane to a second surface of the first membrane to provide the separated water vapor adjacent the second surface of the first membrane and an outflow of the dehumidified air adjacent the first surface of the first membrane; and pressurizing and removing the separated water vapor through an expirator, wherein the expirator includes a second selective transfer membrane configured for flowing the separated water vapor adjacent a first surface of the second membrane under conditions sufficient to allow at least a portion of the water vapor to be transported through the second membrane to a second surface of the second membrane.

In another aspect, the present disclosure provides a system for dehumidifying air. In one embodiment, this system includes: a dehumidifier configured to provide a flow of humid air through the dehumidifier to provide separated water vapor and a flow of the dehumidified air, wherein the dehumidifier includes a first selective transfer membrane configured for an inflow of the humid air adjacent a first surface of the first membrane to allow water vapor to be transported through the first membrane to a second surface of the first membrane to provide the separated water vapor adjacent the second surface of the first membrane and an outflow of the dehumidified air adjacent the first surface of the first membrane; and an expirator configured to pressurize and remove the separated water vapor through the expirator, wherein the expirator includes a second selective transfer membrane configured for flowing the separated water vapor adjacent a first surface of the second membrane to allow at least a portion of the water vapor to be transported through the second membrane to a second surface of the second membrane.

In another aspect, the present disclosure provides a method for independently cooling and separating a component (e.g., water) from a fluid (e.g., humid air). In one embodiment, this method includes: providing a flow of a fluid having a first component through a separator to provide the separated first component and a flow of the fluid having at least a portion of the first component removed, wherein the separator includes a first selective transfer membrane configured for an inflow of the fluid having the first component adjacent a first surface of the first membrane under conditions sufficient to allow at least a portion of the first component to be transported through the first membrane to a second surface of the first membrane to provide the separated first component (e.g., water vapor) adjacent the second surface of the first membrane and an outflow of the fluid having at least a portion of the first component removed adjacent the first surface of the first membrane; providing a flow of warm fluid through a cooler to provide a flow of cooled fluid, wherein the cooler includes a heat exchanger for cooling using a cooled liquid (e.g., an aqueous liquid optionally including additives such as anticorrosive additives and antifreeze) having a second component (e.g., water) and configured for an inflow of warm fluid flowing through the exchanger, resulting in warmed liquid and an outflow of the cooled fluid, and wherein the heat exchanger is configured for flowing the warmed liquid to a chiller, wherein the chiller includes a second selective transfer membrane configured for an inflow of the warmed liquid having the second component adjacent a first surface of the second membrane under conditions sufficient to allow at least a portion of the second component to be transported through the second membrane to a second surface of the second membrane to provide the separated second component (e.g., water vapor) adjacent the second surface of the second membrane and an outflow of the chilled liquid adjacent the first surface of the second membrane; and pressurizing and removing the separated first and/or second components through an expirator, wherein the expirator includes a third selective transfer membrane configured for flowing the separated components adjacent a first surface of the third membrane under conditions sufficient to allow at least a portion of the first and/or second components to be transported through the third membrane to a second surface of the third membrane.

In another aspect, the present disclosure provides a system for independently cooling and separating a component (e.g., water) from a fluid (e.g., humid air). In one embodiment, this system includes: a separator configured to provide a flow of a fluid having a first component through the separator to provide the separated first component and a flow of the fluid having at least a portion of the first component removed, wherein the separator includes a first selective transfer membrane configured for an inflow of the fluid having the first component adjacent a first surface of the first membrane to allow at least a portion of the first component to be transported through the first membrane to a second surface of the first membrane to provide the separated first component (e.g., water vapor) adjacent the second surface of the first membrane and an outflow of the fluid having at least a portion of the first component removed adjacent the first surface of the first membrane; a cooler configured to provide a flow of warm fluid through the cooler to provide a flow of cooled fluid, wherein the cooler includes a heat exchanger for cooling using a cooled liquid (e.g., an aqueous liquid optionally including additives such as anticorrosive additives and antifreeze) having a second component (e.g., water) and configured for an inflow of warm fluid flowing through the exchanger, resulting in warmed liquid and an outflow of the cooled fluid, and wherein the heat exchanger is configured for flowing the warmed liquid to a chiller, wherein the chiller includes a second selective transfer membrane configured for an inflow of the warmed liquid having the second component adjacent a first surface of the second membrane to allow at least a portion of the second component to be transported through the second membrane to a second surface of the second membrane to provide the separated second component (e.g., water vapor) adjacent the second surface of the second membrane and an outflow of the chilled liquid adjacent the first surface of the second membrane; and an expirator configured to pressurize and remove the separated first and/or second components through the expirator, wherein the expirator includes a third selective transfer membrane configured for flowing the separated components adjacent a first surface of the third membrane to allow at least a portion of the first and/or second components to be transported through the third membrane to a second surface of the third membrane.

In another aspect, the present disclosure provides a method for cooling a fluid. In one embodiment, this method includes: providing a flow of warm fluid (e.g., an aqueous fluid optionally including additives such as anticorrosive additives and antifreeze) having a component (e.g., water) through a chiller to provide a flow of cooled fluid, wherein the chiller includes a first selective transfer membrane configured for an inflow of the warm fluid having the component adjacent a first surface of the first membrane under conditions sufficient to allow at least a portion of the component to be transported through the first membrane to a second surface of the first membrane to provide the separated component (e.g., water vapor) adjacent the second surface of the first membrane and an outflow of the chilled fluid adjacent the first surface of the first membrane; and pressurizing and removing the separated component through an expirator, wherein the expirator includes a second selective transfer membrane configured for flowing the separated component adjacent a first surface of the second membrane under conditions sufficient to allow at least a portion of the component to be transported through the second membrane to a second surface of the second membrane.

In another aspect, the present disclosure provides a system for cooling a fluid. In one embodiment, this system includes: a chiller configured to provide a flow of warm fluid (e.g., an aqueous fluid optionally including additives such as anticorrosive additives and antifreeze) having a component (e.g., water) through the chiller to provide a flow of cooled fluid, wherein the chiller includes a first selective transfer membrane configured for an inflow of the warm fluid having the component adjacent a first surface of the first membrane to allow at least a portion of the component to be transported through the first membrane to a second surface of the first membrane to provide the separated component (e.g., water vapor) adjacent the second surface of the first membrane and an outflow of the chilled fluid adjacent the first surface of the first membrane; and an expirator configured to pressurize and remove the separated component through the expirator, wherein the expirator includes a second selective transfer membrane configured for flowing the separated component adjacent a first surface of the second membrane to allow at least a portion of the component to be transported through the second membrane to a second surface of the second membrane.

In another aspect, the present disclosure provides a method for separating a component from a fluid. In one embodiment, this method includes: providing a flow of a fluid (e.g., humid air) having a component (e.g., water) through a separator to provide the separated component and a flow of the fluid having at least a portion of the component removed, wherein the separator includes a first selective transfer membrane configured for an inflow of the fluid having the component adjacent a first surface of the first membrane under conditions sufficient to allow at least a portion of the component to be transported through the first membrane to a second surface of the first membrane to provide the separated component (e.g., water vapor) adjacent the second surface of the first membrane and an outflow of the fluid having at least a portion of the component removed adjacent the first surface of the first membrane; and pressurizing and removing the separated component through an expirator, wherein the expirator includes a second selective transfer membrane configured for flowing the separated component adjacent a first surface of the second membrane under conditions sufficient to allow at least a portion of the component to be transported through the second membrane to a second surface of the second membrane.

In another aspect, the present disclosure provides a system for separating a component from a fluid. In one embodiment, this system includes: a separator configured to provide a flow of a fluid (e.g., humid air) having a component (e.g., water) through the separator to provide the separated component and a flow of the fluid having at least a portion of the component removed, wherein the separator includes a first selective transfer membrane configured for an inflow of the fluid having the component adjacent a first surface of the first membrane to allow at least a portion of the component to be transported through the first membrane to a second surface of the first membrane to provide the separated component (e.g., water vapor) adjacent the second surface of the first membrane and an outflow of the fluid having at least a portion of the component removed adjacent the first surface of the first membrane; and an expirator configured to pressurize and remove the separated component through the expirator, wherein the expirator includes a second selective transfer membrane configured for flowing the separated component adjacent a first surface of the second membrane to allow at least a portion of the component to be transported through the second membrane to a second surface of the second membrane.

In another aspect, the present disclosure provides a method for separating a component from a fluid. In one embodiment, this method includes providing a flow of liquid having a component (e.g. water) through a separator to provide the separated component and a flow of the fluid having at least a portion of the component removed, wherein the separator includes a selective transfer membrane configured for an inflow of the fluid having the component adjacent a first surface of the membrane under conditions sufficient to allow at least a portion of the component to be transported through the membrane to a second surface of the membrane to provide the separated component (e.g., water) adjacent the second surface of the membrane and an outflow of the fluid having at least a portion of the component removed adjacent the first surface of the membrane; and a second aqueous fluid flow adjacent to the second surface of the membrane to absorb the separated component. This method allows for the transfer of the component from one flow of liquid to another.

In another aspect, the present disclosure provides a system for separating a component from a fluid. In one embodiment, this method includes providing a flow of liquid have a component (e.g. water) through a separator to provide the separated component and a flow of the fluid having at least a portion of the component removed, wherein the separator includes a selective transfer membrane configured for an inflow of the fluid having the component adjacent a first surface of the membrane under conditions sufficient to allow at least a portion of the component to be transported through the membrane to a second surface of the membrane to provide the separated component (e.g., water) adjacent the second surface of the membrane and an outflow of the fluid having at least a portion of the component removed adjacent the first surface of the membrane; and a second fluid flow adjacent to the second surface of the membrane to absorb the separated component. This method allows for the transfer of the component from one flow of liquid to another.

The methods and systems cited above can be suitable for both large and small air conditioning and heat pump applications. Due to the type of equipment and membrane structure the device will be compact and of light weight making it suitable for transportation applications as well as fixed installations. In certain embodiments, the methods and systems disclosed herein can offer advantages including one or more of demonstrable reductions in energy consumption; lower emissions resulting, for example, from lower energy consumption; and/or elimination or reduction of the use of harmful fluorocarbon producing refrigerant gases that can damage the ozone layer.

As used herein, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

The above brief description of various embodiments of the present disclosure is not intended to describe each embodiment or every implementation of the present disclosure. Rather, a more complete understanding of the disclosure will become apparent and appreciated by reference to the following description and claims in view of the accompanying drawing. Further, it is to be understood that other embodiments may be used and structural changes may be made without departing from the scope of the present disclosure.

DETAILED DESCRIPTION OF ILLUSTRATIVE EMBODIMENTS

Figure 1:
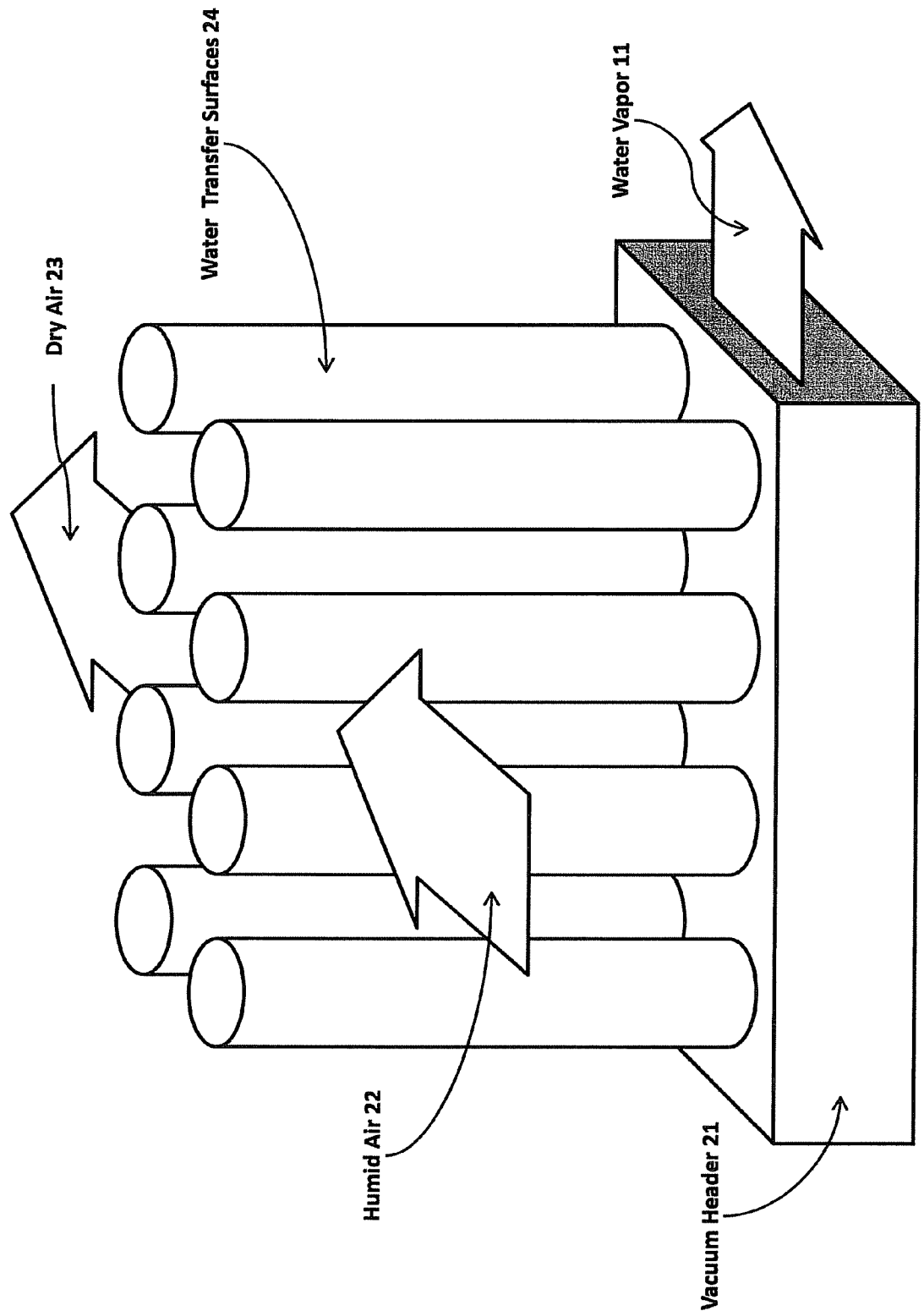
FIG. 1 is a schematic illustration of an embodiment of a selective mass exchanger for dehumidifying air.

Systems and methods for cooling and/or separating a component from a fluid are disclosed herein. Such systems and methods can include one or more of a separator (e.g., a dehumidifier), a chiller, and/or an expirator (i.e., a humidifier). Each of the forgoing devices can employ a selective transfer membrane to control the separation and/or absorption of a component from one fluid to another fluid through a mechanism of controlled solid state permeation, while keeping the respective fluids separate. The separation of a component from one fluid and its absorption by another fluid can have thermodynamic effects that are desirable for a wide variety of applications. For example, the separation of moisture from an air flow (fluid) is desirable for a dehumidifier. For another example, the separation of moisture through a phase change from a body of water to cool the body of water is desirable for a chiller. For even another example, the absorption of moisture from a selective transfer membrane into a fluid (air) is desirable for a humidifier. The same or different selective transfer membrane can be used for each separator (e.g., dehumidifier), chiller, and/or expirator (e.g., humidifier). Such systems and methods can be used for a wide variety of applications including, for example, cooling and/or dehumidifying air.

Selective Transfer Membranes

Many new methods of modifying the temperature and humidity of air and other fluids become possible when they are based on a material that can selectively transfer water molecules (or certain other targeted molecules) while preventing oxygen, nitrogen, and other components of air and common gases from passing from one surface of the membrane through to the second surface of the same membrane.

For example, a class of polymer membranes has been developed that uses a nanometer-scale organizational structure of bound electrical charges to selectively transfer water at a molecular level from the higher vapor pressure to the lower vapor pressure side. The membrane can self-organize into hydrophilic and hydrophobic domains that are contiguous from the first surface of the membrane to the second surface of the membrane. The contiguous hydrophobic domains can be substantially water and gas impermeable. The contiguous hydrophilic domains can be permeable to small molecules that have large dielectric constants while being substantially impermeable to large molecules, and both large and small molecules that have low dielectric constants. Permeability properties based on size and dielectric constant can make the membrane selective. Because the membrane is selective and severely restricts the transfer of oxygen, nitrogen, and/or other atmospheric gases, the driving force for moisture transfer can be largely independent of the partial pressure of the moisture. Useful exemplary polymers and methods of preparing such polymers are disclosed, for example, in U.S. Pat. No. 5,468,574 (Ehrenberg et al.), U.S. Pat. No. 5,679,482 (Ehrenberg et al.), U.S. Pat. No. 6,110,616 (Sheikh-Ali et al.), U.S. Pat. No. 6,306,419 (Vachon et al.); U.S. Pat. No. 6,383,391 (Ehrenberg et al.), U.S. Pat. No. 6,413,298 (Week et al.), U.S. Pat. No. 6,841,601 (Serpico et al.), U.S. Pat. No. 7,179,860 (Cao et al.), U.S. Pat. No. 7,582,702 (Wright et al.), U.S. Pat. No. 7,585,916 (Wright et al.), U.S. Pat. No. 7,592,390 (Bening et al.), U.S. Pat. No. 7,625,979 (Atwood et al.), U.S. Pat. No. 7,737,224 (Willis et al.), U.S. Pat. No. 7,847,022 (Wright et al.), U.S. Pat. No. 7,887,926 (Ober et al.), U.S. Pat. No. 7,919,565 (Willis et al.), U.S. Pat. No. 7,977,432 (Bening et al.), and U.S. Pat. No. 7,981,970 (Willis et al.); U.S. Patent Application Publication Nos. 2004/0142910 A1 (Vachon et al.), 2006/0292208 A1 (Vachon), and 2010/0170776 A1 (Ehrenberg et al.); PCT International Publication Nos. WO 2005/030812 A1 (Cao et al.), 2008/141179 A1 (Ehrenberg et al.), 2009/002984 A2 (Vachon et al.); and U.S. Ser. No. 61/293,637 (Ehrenberg).

Other materials can conceivably by used in these systems. Exemplary qualifications for a candidate material include, for example, selectivity (i.e., the ability to maintain a strong absolute pressure differential across the material without transferring excessive amounts of non-targeted gases through the material) and flux capability (i.e., the ability to rapidly transfer a target fluid (usually water) from one side of the material to the other).

Possible candidate materials include (but are not limited to) fluoropolymers (e.g., those available under the trade designation NAFION) used as proton exchange membranes, polyesters, polyurethanes, and desiccant-treated nonwovens similar to those used in energy recovery ventilators. In some embodiments the utility of these materials may be limited by factors including, for example, water flux rates, air permeability, and/or cost.

A general description of the membrane operation is to state that the water content within the membrane is in dynamic equilibrium with the vapor pressures present at the surfaces of that membrane. The membrane absorbs water molecules into its hydrophilic regions and allows the molecules to move within those regions. At the surfaces of the membrane, a dynamic equilibrium exists between water molecules that are absorbed from the surrounding fluid into the membrane and water molecules desorbed from the membrane into the fluid. In a situation with two membrane surfaces in close proximity but exposed to different vapor pressures reflecting different vapor concentrations (i.e. a thin membrane exposed to two different fluids), the mobility of water molecules within the membrane allows a dynamic equilibrium between the two surfaces, with more water molecules absorbing from the high vapor pressure fluid into the membrane than are desorbing and more water molecules desorbing from the membrane into the low vapor pressure fluid than are absorbing. Thus, the vapor pressure differential between the two surfaces drives a net flux of water molecules through the membrane.

Selective Mass Exchangers

Figure 2:
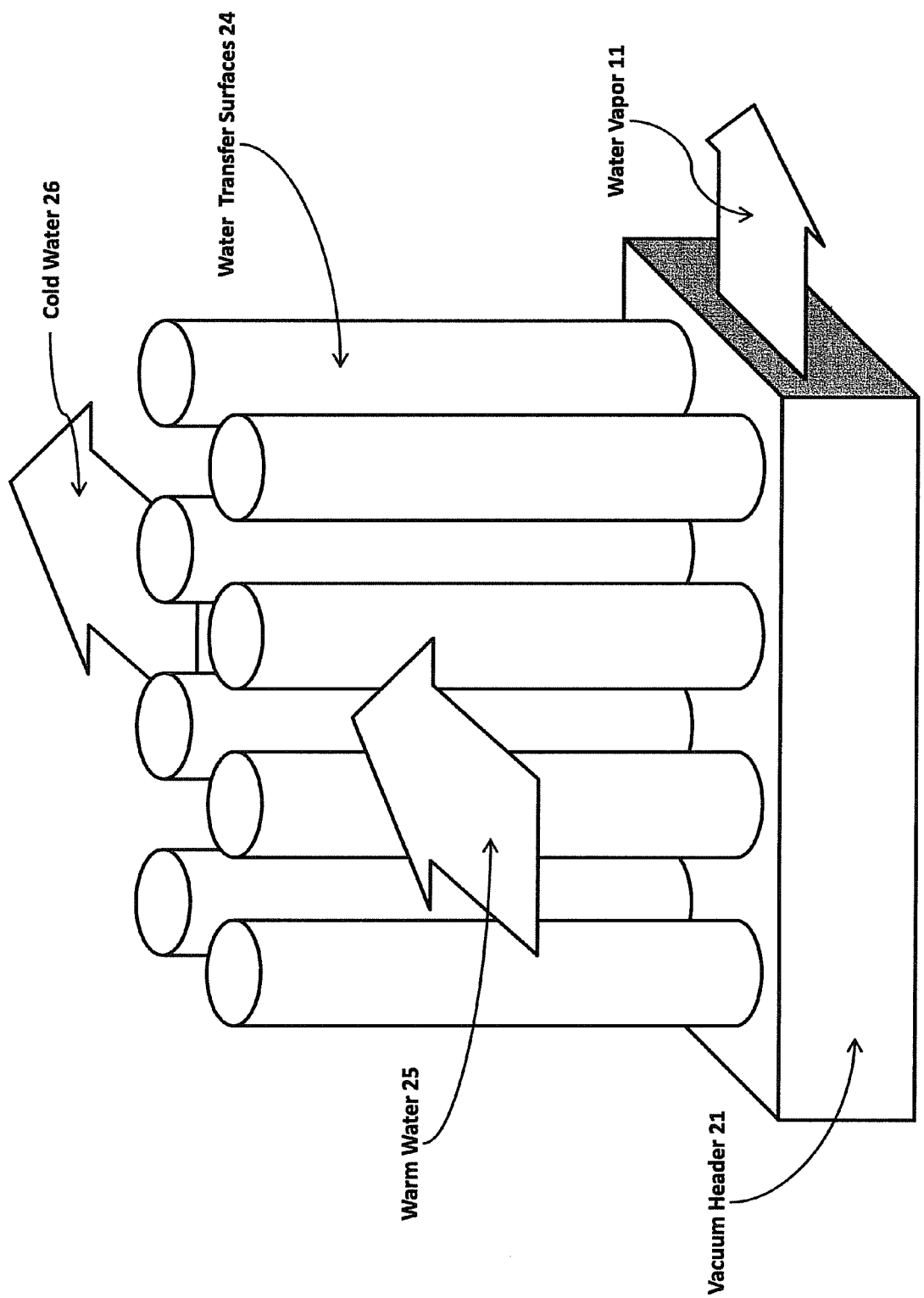
FIG. 2 is a schematic illustration of an embodiment of a selective mass exchanger for chilling an aqueous liquid.

One concept in this system is the selective mass exchanger that transfers molecules of the working fluid across the membrane surface in either direction while reducing crossover or leakage by the process fluid. In FIG. 2, the dehumidifier, chiller, and expirator are all forms of this selective mass exchanger concept. There are differences between them in terms of the temperature, composition, and phase of the fluids on either side of the membrane, but there can also be similarities between the geometries of each device.

Figure 3:
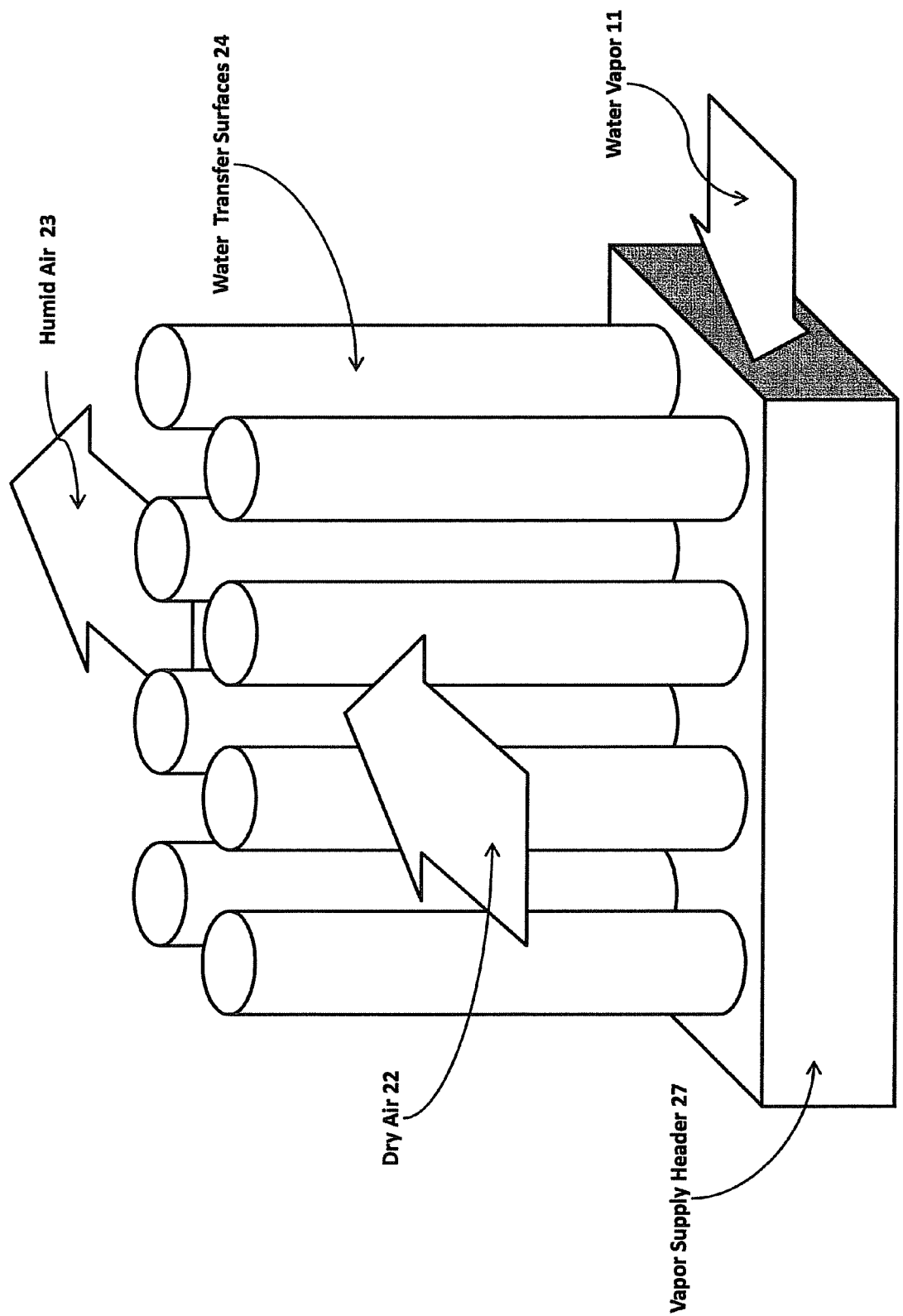
FIG. 3 is a schematic illustration of an embodiment of a selective mass exchanger for humidifying air.

FIGS. 1, 2, and 3 show the dehumidifier, chiller, and expirator as three applications of the same fundamental geometry, with tubular selective transfer surfaces feeding to or from a common header. There can be numerous variations on this layout, including but not limited to: an exchanger may have headers at both ends of the transfer tubes; the selective transfer surfaces may be non-tubular or have extended surfaces to increase area; or the device may be laid out in a prismatic array with flat sheets of membrane stacked in an array. All of these options are design decisions made by a practitioner skilled in the art; what is shown in this disclosure is merely a preferred embodiment.

In certain embodiments, one feature of the membrane used in the selective transfer surfaces is bidirectional operation. For example, one difference between the dehumidifier and the expirator in FIG. 1 is the direction of mass transfer. This means that a component can be operated in different modes. In one mode it might be a dehumidifier, but if the system is placed into a heat pump mode the same component might be called upon to act as a humidifier.

Membrane Dehumidifier

The concept of a membrane dehumidifier takes advantage of vapor pressure differential to draw moisture out of a fluid stream. Referring to FIG. 1, a moist fluid stream, humid air 22 in this example, is presented to a first surface of the water transfer surfaces 24 while a second surface of the water transfer surfaces 24 is evacuated through the vacuum header 21 to a lower vapor pressure. The pressure differential will drive the migration of the water molecules from the first surface to the second surface. As long as the pressure differential is maintained in this direction, the flux will continue and the exiting dry air 23 will be dehumidified.

If the water transfer surfaces 24 are highly permeable to oxygen, nitrogen, and argon, then those molecules will also migrate from the first surface to the second surface and may need to be evacuated by the vacuum source. One example of a water transfer surface is a selective membrane designed to allow water molecules to transfer preferentially while restricting other species. Some of the membranes as described herein are highly impermeable to air, so water molecules are typically preferentially transferred at a rate that enables efficient operation of the device. Thus, any oxygen, nitrogen, or argon initially present at the second surface is evacuated, ensuring a high ratio of water molecules to air molecules at the second surface, which can improve performance for at least two reasons. First, because the energy needed to evacuate the second surface can be heavily dependent on mass flow, it is preferable that the membrane be selective for the desired molecule being transferred (e.g., water in this case). Low selectivity can result in energy being expended to move air instead of water molecules. Second, a highly selective membrane can leave air molecules behind in the process flow, ensuring that the device is truly drying and dehumidifying the air stream instead of just diverting mass.

Figure 8:
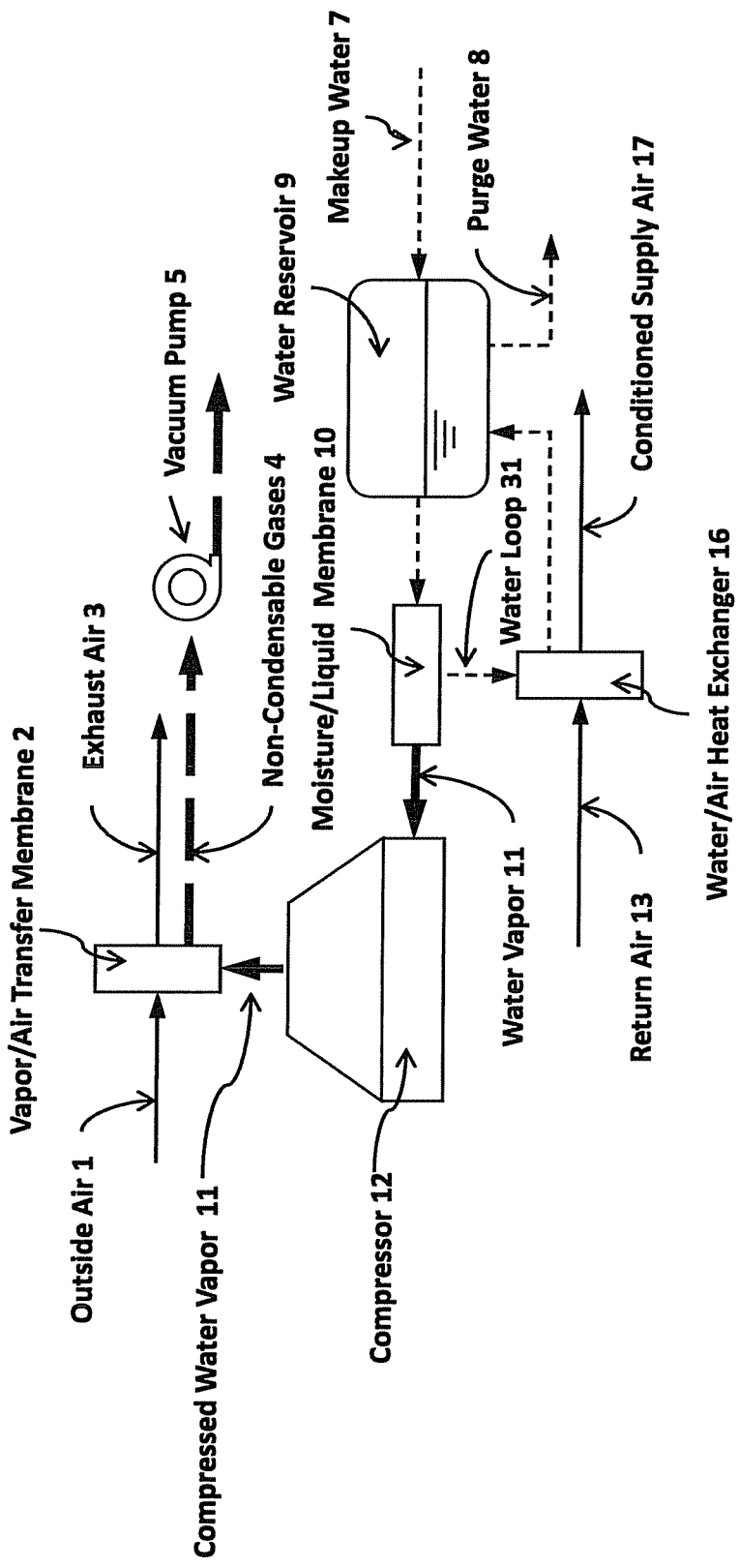
FIG. 8 is a schematic illustration of one embodiment of an exemplary evaporative chiller system as described in Example 3.

Membrane Chiller (e.g., as Illustrated in FIGS. 2 and 8).

Referring to FIG. 2, a membrane chiller can have similarities to the dehumidifier, but the fluid at the first surface can be a liquid or liquid mixture containing water or other molecules that can transfer readily through the chosen membrane. When the second surface of the membrane is drawn down to a pressure lower than the vapor pressure of the liquid at the first surface, the flux of water molecules through the membrane includes a change in state from liquid on one side to vapor on the other. The heat of evaporation needed for this phase change can come from the liquid water that remains behind, thus reducing the temperature of the liquid, which is the principle of evaporative cooling. This cooling effect can be used to chill water for use in a sensible heat exchanger or coil. See, for example, water/air heat exchanger 16 as illustrated in FIG. 8, which can be used throughout the HVAC-R industries.

The membrane chiller can have a variety of advantages compared to other chillers. For example, in certain embodiments, the membrane chiller doesn't require a refrigerant like those used in vapor compression cycles. The most common refrigerants can have significant global warming potentials and are under pressure to be phased out of common use, and low global warming potential refrigerants have not achieved the same level of commercial acceptance. For another example, evaporative chillers (known as "swamp coolers") have been used in dry climates, but they are unable to drop either the air temperature or the water temperature below the wet-bulb temperature of the outside air. Because the selective transfer membrane second surface can be operated below atmospheric pressure, the temperature of water in contact with the first surface can be taken down the atmospheric wet-bulb temperature to within a few degrees of freezing. The control of the second membrane surface pressure sets the temperature within the body of water in contact with the first surface of the membrane. The temperature range and control allows the chiller to function to smoothly adjust from air conditioning to becoming a refrigeration device.

Expirator (e.g., as Illustrated in FIG. 3).

One limitation of vacuum based dehumidification has always been the issue of removing the water vapor from the system to make room for more. Compressing the vapor to atmospheric pressure and allowing it to flow out is technically possible but can require a large energy expenditure. A typical vapor pressure needed for dehumidification is 1 kPa absolute, and approximately 100:1 compression ratio needed to reach atmospheric pressure increases the enthalpy of the water vapor by 1570 kJ/kg (assuming 75% compressor efficiency) and raises the temperature to almost 1450° F. This can be prohibitive in terms of both energy expenditure and material requirements to deal with the exit temperature.

Using a selective membrane as disclosed herein allows a way around this problem. Moisture transfer through the membrane is driven by vapor pressure differential and is largely unaffected by the concentration of O2 and N2 molecules. Even the worst case ASHRAE dehumidification design conditions (Biloxi, Miss.) have a vapor pressure of only 3.76 kPa; the other 97.57 kPa of partial pressure provided by $O_2$ and $N_2$ molecules do not significantly hinder movement of water molecules. As soon as the vapor pressure on the process side of the membrane rises above 3.76 kPa, water molecules begin transferring into the ambient air. See, for example, dry air 22 and humid air 23 in FIG. 3. If there are no $O_2$ or $N_2$ molecules present on the process side, the absolute pressure differential might appear to oppose this moisture transfer, but this absolute pressure differential actually does not affect the migration of the water molecules.

This property of the membrane can be exploited with a device we term an "expirator." Low pressure water vapor (typically, but not exclusively, from the membrane dehumidifier and/or the membrane chiller) is compressed and fed to a first surface of the membrane in the expirator with a vapor pressure higher than the partial pressure of the water vapor in the fluid flowing past a second surface of the membrane. Water molecules are transferred from the first to the second surface of the membrane, humidifying the fluid at the second surface and exhausting the moisture from the system in an energy efficient manner. See, for example, dry air 22 and humid air 23 in FIG. 3.

The expirator can be liquid cooled as well. In this case, the fluid passing over the membrane surfaces to remove the vapor is usually water, but can more generally be a mixture containing water with other substances or any fluid that has a high permeability through the membrane used to form the expirator surface. If the fluid is pure water, the distinction between partial pressures drawn above no longer applies, as all of the molecules interacting with the membrane are water. However, there is a relationship between the liquid temperature and the vapor pressure experienced by that surface of the membrane. If the vapor source at the first surface presents a higher vapor pressure to the membrane than the vapor pressure exerted by the fluid at the second surface, then there will be a net movement of water molecules to condense into the fluid at the second surface.

General Usage as a System

To summarize, a process fluid (usually, but not exclusively, air) is conditioned (adjusted for desirable temperature and concentration of selected vapors) by means of latent energy exchange across a selectively permeable material (hereafter referred to as a membrane). Sensible energy is exchanged from the process fluid to a working fluid (usually, but not exclusively, water) through heat exchangers, but the temperature of the working fluid is controlled by latent energy exchange across the membrane.

A typical application (others will be detailed later) involves reducing the temperature and humidity of air inside an enclosure (the process fluid) while moving the excess heat and humidity outside the enclosure to an environment that is warmer and has a higher vapor pressure, conditions that prevent spontaneous transfer in the desired direction. Many of these same principles can be readily applied in slightly different circumstances, such as to control the vapor pressure of a fluid other than water, but in the system shown in FIG. 4 we will discuss air conditioning with water as the working fluid.

Some of the principles and components of this system are further described in, for example, U.S. Patent Application Publication Nos. 2010/0031817 A1 (Ehrenberg et al.) and 2010/0170776 A1 (Ehrenberg et al.).

In this case, a closed, evacuated system is used to transfer water vapor from two sources inside the enclosure to the environment outside. The first source of water vapor is the process fluid itself—vapor is drawn across the membrane into the evacuated system because its absolute pressure is less than the vapor pressure of the water in the process fluid. This occurs inside a component identified as a dehumidifier. The second source of water vapor is a stream of liquid water inside a component identified as a chiller. This liquid water is brought in contact with one surface of the membrane while the evacuated system is in contact with the other surface. Because the absolute pressure of the evacuated system is again lower than the vapor pressure of the water, water molecules evaporate through the membrane into the vacuum. The heat of evaporation is drawn from the liquid water, causing evaporative cooling of the remaining liquid, which can then be circulated through the cooling coil to reduce the temperature of the process fluid.

The water vapor drawn from the dehumidifier and chiller is then compressed and moved outside the enclosure to an outdoor mass exchanger. After compression, the water vapor is still at a very low absolute pressure (2-5 kPa), but the selective permeability of the membrane ensures the vapor is primarily water or process fluid. The outside air circulating over the other surface of the membrane may be at a higher pressure than the water or process fluid, but water molecules make up only a portion of the overall composition and have lower partial pressure than the water or process fluid. Thus the vapor pressure differential drives the transfer of water out of the evacuated system, dispersing the water molecules into the atmosphere.

Figure 4:
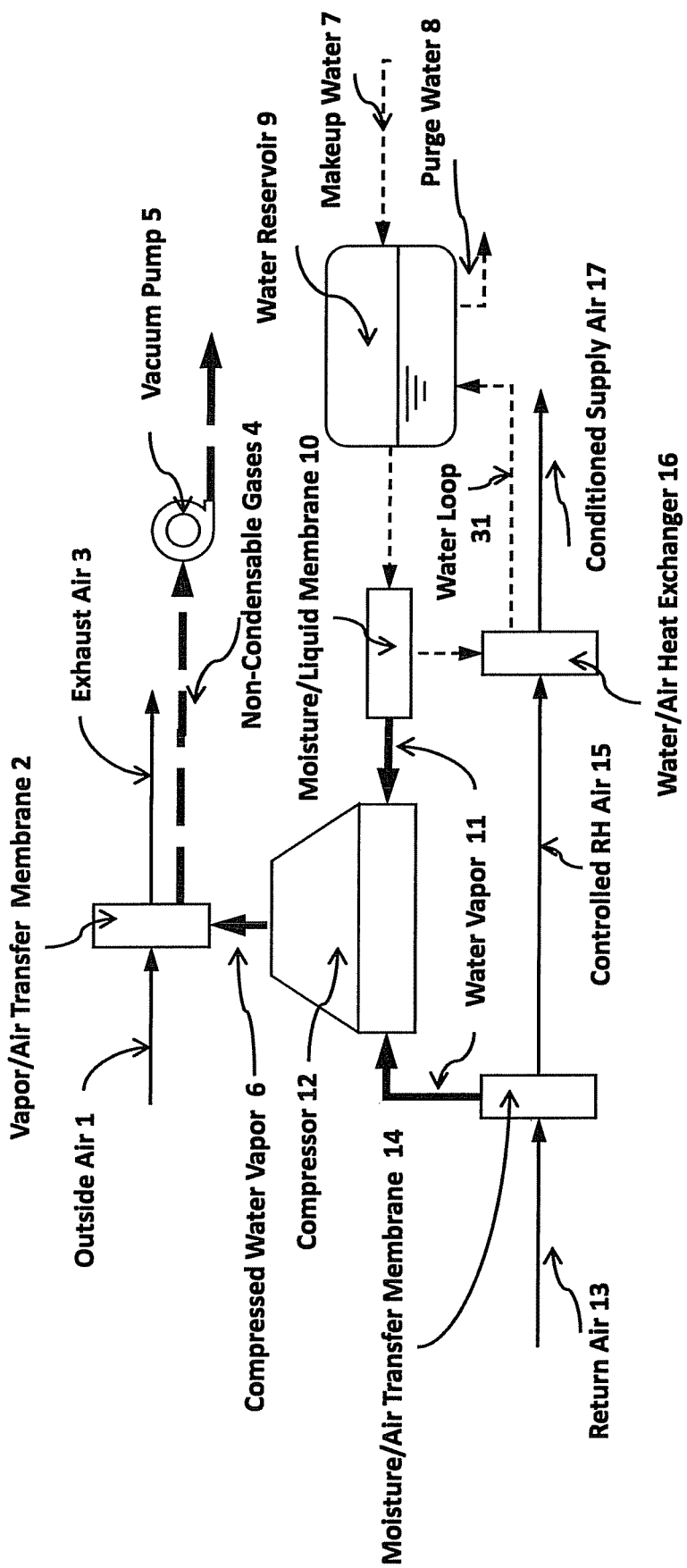
FIG. 4 is a schematic illustration of an embodiment of a membrane-based air conditioning system.

The diagram in FIG. 4 shows a vacuum pump 5 connected to the outdoor mass exchanger that draws the system down to operating pressure by removing any air. Once the system is at vacuum, this pump can shut off during normal operation. Any vacuum system is going to have leakage, and as oxygen and nitrogen enter they will be trapped, unable to exit across the membrane or to leak outwards against the absolute pressure gradient. Over time, non-condensable gases of this type begin to raise the back pressure on the compressor and reduce the ability to bring water molecules in contact with the membrane. To cope with this, the vacuum pump can be periodically restarted to purge the system and return it to operating pressure. However, this is a large loss of energy that should be avoided as much as possible, which is why the ability to limit the transfer of non-condensable gases is a factor for selecting membrane materials. Also omitted from FIG. 4 are control valves, ducts, and fittings that would be present in the final implementation.

The following examples are offered to further illustrate various specific embodiments and techniques of the present disclosure. It should be understood, however, that many variations and modifications understood by those of ordinary skill in the art may be made while remaining within the scope of the present disclosure. Therefore, the scope of the disclosure is not intended to be limited by the following examples.

EXAMPLES

Example 1

Comfort Air Conditioning as Illustrated in FIG. 4

One of the most common uses for this system can be for comfort air conditioning of an interior space, i.e. cooling and dehumidifying air that is then circulated into a given space. The system itself can be packaged in many forms (e.g. a packaged rooftop unit that draws and recirculates air from the space, a split system with an internal air handler that directs vapor to an external mass exchange unit, etc.).

The schematic of a basic comfort air conditioning system is shown in FIG. 4. System operation begins when the vacuum pump 5 evacuates the closed system represented by mass exchangers vapor/air transfer membrane 2, moisture/air transfer membrane 14, moisture/liquid transfer membrane 10, compressor 12, and the connections between them. The vacuum pomp removes air and any gases populating the closed system until the pressure reaches a chosen value less than the lowest vapor pressure desired in the air or water systems it is exposed to. Once at design pressure, the vacuum pump is turned off, except for purge operations that are discussed herein.

There are three selective mass exchangers in the system, labeled vapor/air transfer membrane 2, moisture/air transfer membrane 14, and moisture/liquid transfer membrane 10. In the operational mode shown here, moisture/air transfer membrane 14 plays the role of dehumidifier, moisture/liquid transfer membrane 10 acts as a chiller, and vapor/air transfer membrane 2 acts as an expirator. Other configurations of selective mass exchangers will be described later.

Moisture/air transfer membrane 14 dehumidifies the return air 13 drawn from the enclosed space without significantly altering the temperature of the air as water molecules (water vapor 11) are drawn from the air into the low pressure regime inside the evacuated system. The controlled RH air 15 exits moisture/air transfer membrane 14 with a lower vapor pressure than it entered with and travels through a chilled water coil water/air heat exchanger 16, where it is sensibly cooled to bring the air temperature to the desired exit set point. Dehumidification without temperature change is an advance in air conditioning techniques that allows for independent control of two variables, which increases user comfort and avoids energy-intensive strategies that can require overcooling and reheating of the air.

Controlled RH air 15 passes to the chilled water coil water/air heat exchanger 16 and then exits as a cooler conditioned supply air 17. The chilled water exits water/air heat exchanger 16 after increasing in temperature as it gains heat from the air and can be chilled before re-entering the coil. This can be accomplished by the water loop 31, which circulates water from the water/air heat exchanger 16 to the moisture/liquid transfer membrane 10, which places the water on one surface of the selective transfer surface and exposes the opposite surface to the evacuated system described above. Since the vapor pressure of the water molecules in liquid is higher than the pressure of the evacuated system, there is a net evaporation of water molecules (water vapor 11) passing through the membrane from the liquid into the evacuated system. This phase change draws heat from the liquid water, decreasing its temperature and preparing it to return to the chilled water coil water/air heat exchanger 16.

Both moisture transfer membrane 10 and moisture transfer membrane 14 generate water vapor that enters the closed vacuum system described above. These water molecules can be removed to maintain the vapor pressure differential required to transfer water. This can be accomplished by a vapor compressor 12 that moves the vapor molecules to a higher pressure compressed water vapor 6 state where their partial pressure is higher than the partial pressure of the outside air 1. Since the selectivity of the moisture transfer membranes ensures that the gases present include a significantly higher percentage of water molecules in the compressed water vapor 6, this partial pressure typically occurs at an absolute pressure far lower than the pressure of the outside air 1. Driven by this partial pressure differential, water vapor crosses the vapor/air transfer membrane 2 and exits with the exhaust air 3. Trace amounts of nitrogen, oxygen, etc. that enter the vacuum through the inevitable leaks cannot substantially cross the membrane and cannot readily be captured as a liquid at normal temperatures; as such, they are referred to as non-condensable gases 4. Non-condensable gases 4 act to increase the energy required by the compressor 12, so they can be purged from the system by the same vacuum pump 5 that initially evacuates the system.

Since there is a net mass transfer out of the water loop, in some embodiments it may be desirable to provide a system to replenish the water supply. Because in some embodiments water is the only molecule in the water supply to easily pass through the membrane, all other constituents in the water loop (particulates, chemicals, etc.) can become concentrated over time as the replacement water can bring in new contaminants. Therefore it may be desirable to provide a periodic purge mechanism 8 that can empty the system of water whose contaminants have grown concentrated and replace it with a fresh supply.

A simple mechanism shown in FIG. 4 is the storage tank labeled water reservoir 9. The water reservoir 9 provides water volume to minimize the frequency of water purges and is a convenient location for a level sensor that signals the need to bring in makeup water 7 to replenish the system.

Example 2

Figure 5:
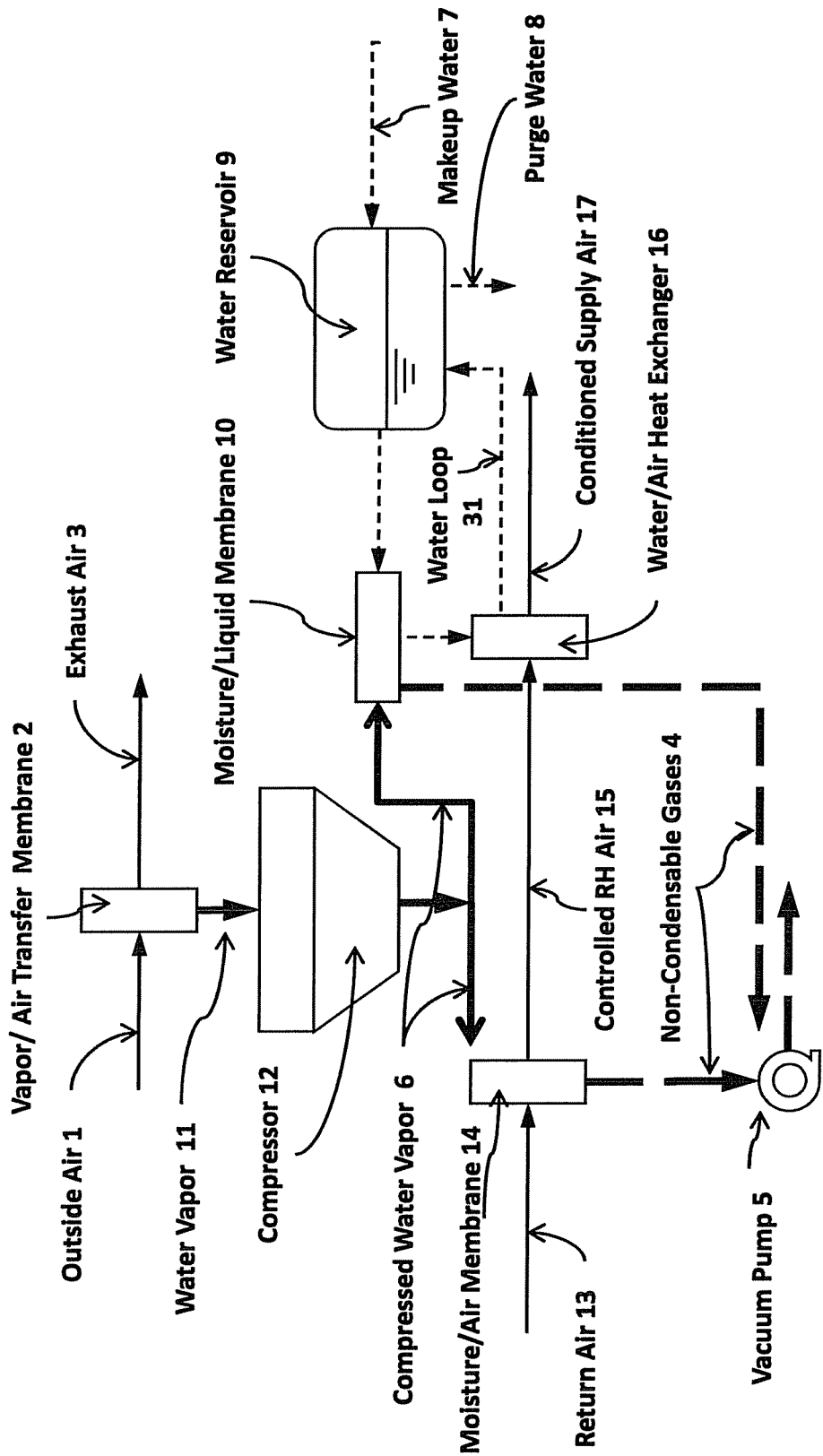
FIG. 5 is a schematic illustration of one embodiment of an exemplary heat pump system.

Heat Pump Comfort Air Conditioning as Illustrated in FIG. 5

One of the most common uses for this system can be to heat and humidify an interior space by treating air that is then circulated into the conditioned space. The system is similar to the one in Example 1 and can be packaged in many forms (e.g. a packaged rooftop unit that draws and recirculates air from the space, a split system with an internal air handler that directs vapor to an external mass exchange unit, etc.).

The components of the system can act bi-directionally and are connected in the same manner with the exception of the compressor 12. The compressor 12 is re-plumbed to draw moisture from the vapor/air transfer membrane 2. Outside air 1 is dehumidified as it passes through the vapor/air transfer membrane 2 and then exhausted as exhaust air 3. Compressor 12 generates compressed water vapor 6 and sends it to moisture/air membrane 14 and moisture/liquid membrane 10. Because the higher vapor pressure exists on the same side as the compressor 12, water vapor passes out of the system and into the return air 13 and/or the controlled RH air 15.

Return air 13 is humidified as it passes over moisture/air membrane 14, becoming controlled RH air 15. In certain embodiments, there is little significant transfer of heat in this step, as there is no phase change involved. Controlled RH air 5 passes over water/air heat exchanger 16 to become conditioned supply air 17.

Example 3

Figure 6:
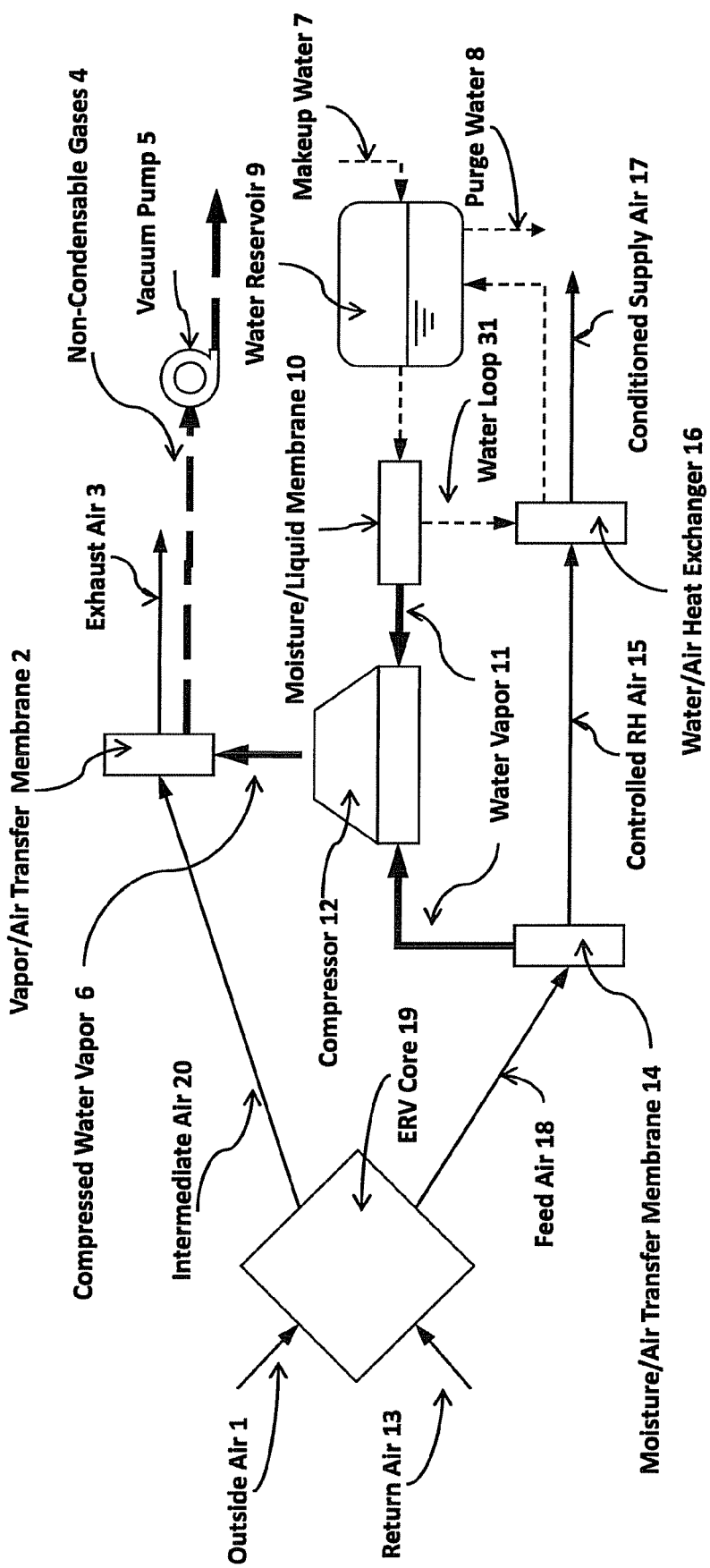
FIG. 6 is a schematic illustration of one embodiment of an exemplary dedicated outdoors air system as described in Example 2.

Dedicated Outdoor Air System, FIG. 6

Dedicated Outdoor Air Systems (DOAS) are an increasingly popular concept in heating, ventilating, and air conditioning commercial buildings. Also known as 100% Outside Air Systems, they are designed to condition the fresh ventilation air being brought into a building separately from the air being re-circulated within the space. This makes it possible to deliver proper ventilation airflows independently from the cooling requirements of the indoor space and helps to maintain comfortable indoor humidity levels. See, for example, Murphy, *ASHRAE Journal* 2006, 48 (30-37).

A common approach to DOAS design is to create a system that dehumidifies the ventilation air by cooling it to 55° F. and then reheats the air to deliver it at a space-neutral temperature (typically 70-75° F.), a configuration commonly referred to as a neutral air system. Two trends in the design of DOAS systems are to deliver ventilation air that has either been dehumidified further than necessary for a neutral air system or to deliver ventilation air at a colder temperature than space-neutral. Delivering drier air can eliminate the latent load handled by the separate recirculation system, meaning that second system can operate with dry coils or can be a type that has no latent capability. Delivering cold air can eliminate the wasteful step of reheating the air to neutral temperatures when the air will eventually be processed by the recirculation system and cooled a second time to remove the internal heat loads.

There are operational constraints and difficulties that may need to be addressed when delivering cold air from a DOAS system. Some of the interior space is likely to be overcooled past the comfort level of its occupants, particularly at partial load conditions. If overcooled outdoor air is fed directly into recirculation units it lowers the cooling load without reducing the airflow, potentially upsetting the design balance of the air handler. If the outdoor air is allowed to mix directly with the conditioned space (a decoupled application) it avoids this concern, but condensation problems can be caused by overly cold spaces. As a result, most cold air systems include reheat to modulate the air delivery temperature.

A unit capable of dehumidifying the air independently from the air temperature (i.e. able to reduce humidity directly without dropping its temperature below dew-point to induce condensation) can have one or more advantages such as, for example, the ability to deliver space neutral air without consuming energy for reheat; the ability to deliver space neutral temperatures while removing enough moisture to handle the latent load of the internal space; and the ability to modulate both temperature and humidity to react to building conditions.

FIG. 6 is an illustration showing a combination of energy recovery ventilation with selective mass exchangers and a closed vacuum system used to shuttle moisture from the incoming ventilation air to the outgoing exhaust air, while also chilling a liquid water supply by evaporation for sensible cooling purposes.

The fresh ventilation air, outside air 1, is brought in to a fixed plate energy recovery ventilator ERV core 19, where it gives up heat and humidity becoming feed air 18 as it passes on the opposite side of a nanostructured moisture transfer membrane (MTM) from the return air 13 being exhausted from the building. The return air 13 from the conditioned environment absorbs sensible temperature and latent moisture from outside air 1 becoming intermediate air 20. This absorption can be mediated by a selective transfer membrane as described, for example, in U.S. Pat. No. 6,841,601 (Serpico et al.), U.S. Pat. No. 6,413,298 (Wnek et al.), and U.S. Pat. No. 6,383,391 (Ehrenberg et al.). Intermediate air 20 has less humidity and temperature than the outside air and will absorb additional sensible temperature and latent humidity increasing the overall efficiency of the system beyond what is possible by simply using outside air across vapor/air membrane 2.

Referring again to FIG. 6, after exiting the core, the fresh ventilation air, feed air 18, passes through a direct transfer dehumidifier section, moisture/air transfer membrane 14, consisting of tubes of selective transfer membrane open to a vacuum header 21 at one end (see FIG. 1). The presence of a vacuum whose absolute pressure is below the vapor pressure of the air passing (humid air 22) over the tubes causes a net transfer of water molecules into the vacuum, dehumidifying the air (dry air 23) without substantially lowering the temperature.

The dehumidified air, controlled RH air 15, is then passed through a chilled water coil, water/air heat exchanger 16, to be brought down to the appropriate supply temperature and becomes conditioned supply air 17. The water, circulating in water loop 31, leaves the coil at a higher temperature as it returns to the storage reservoir 9 used to maintain a proper water level, but that excess heat can be removed from the water in circulating water loop 31 (FIG. 6) by an evaporative chiller, moisture/liquid membrane 10 (shown in FIG. 6 and in detail in FIG. 2) very similar in structure to the direct contact dehumidifier, moisture/air transfer membrane 14. Here the vacuum draws water molecules from the liquid water on the outside of the tubes, cooling the liquid water by evaporation until it leaves the chiller and returns to the chilled water coil.

Both the dehumidifier, moisture/air transfer membrane 14, and the chiller, moisture/liquid transfer membrane 10, produce a steady supply of low pressure water vapor. The utility of the methods and systems described herein can depend on the fact that the membrane selected is largely impermeable to oxygen, nitrogen, carbon dioxide, and most of the molecules in our air. Since these molecules cannot pass through the membrane in great quantity, the vacuum system only has to handle the water vapor, with few inert molecules interfering and requiring more energy. While these molecules may be present in the vacuum system on startup, the vacuum pump that draws the system down to its operating pressure will expel most, if not all, to the outside air. When the pressure drops below the dew point on the outside of the membrane, water vapor begins to be pulled through and the vacuum pump is shut down. No vacuum system is entirely leak free, so it is expected that air and other non-condensable gases 4 will enter the system over time. The vacuum pump will energize periodically and remove the accumulated gases to restore the system to peak efficiency or can be run continuously at a low level to achieve the same effect.

The water vapor 11 produced by the dehumidifier and chiller is routed to a vapor compressor, compressor 12, designed to move a large volume of very low-pressure vapor through a pressure ratio of at least 1. The compressor pushes this higher-pressure water vapor, compressed water vapor 6, into the expirator, vapor/air transfer membrane 2 (shown in FIG. 6). The expirator is basically the reverse of the dehumidifier section. In this embodiment the water vapor is at a higher vapor pressure than the air on the outside of the membrane and water molecules are transferred from the vapor to the air, exhaust air 3. This process finishes the overall cycle, rejecting the heat and humidity picked up while conditioning the ventilation air.

Alternative methods can also be envisioned for this example. For example, one embodiment uses the same moisture transfer membrane to construct the ERV as the water transfer surfaces shown in the dehumidifier, chiller, and expirator. Other forms of energy recovery exist and several have been incorporated with cooling systems to make a more efficient DOAS than a straight vapor compression cycle. The arrangement of dehumidifier, chiller, and aspirator described here forms a unique system that has not been incorporated into a DOAS previously, and it is certainly possible to combine these components with an enthalpy wheel or alternate form of energy recovery ventilation to make a system as envisioned herein.

Example 4

Figure 7:
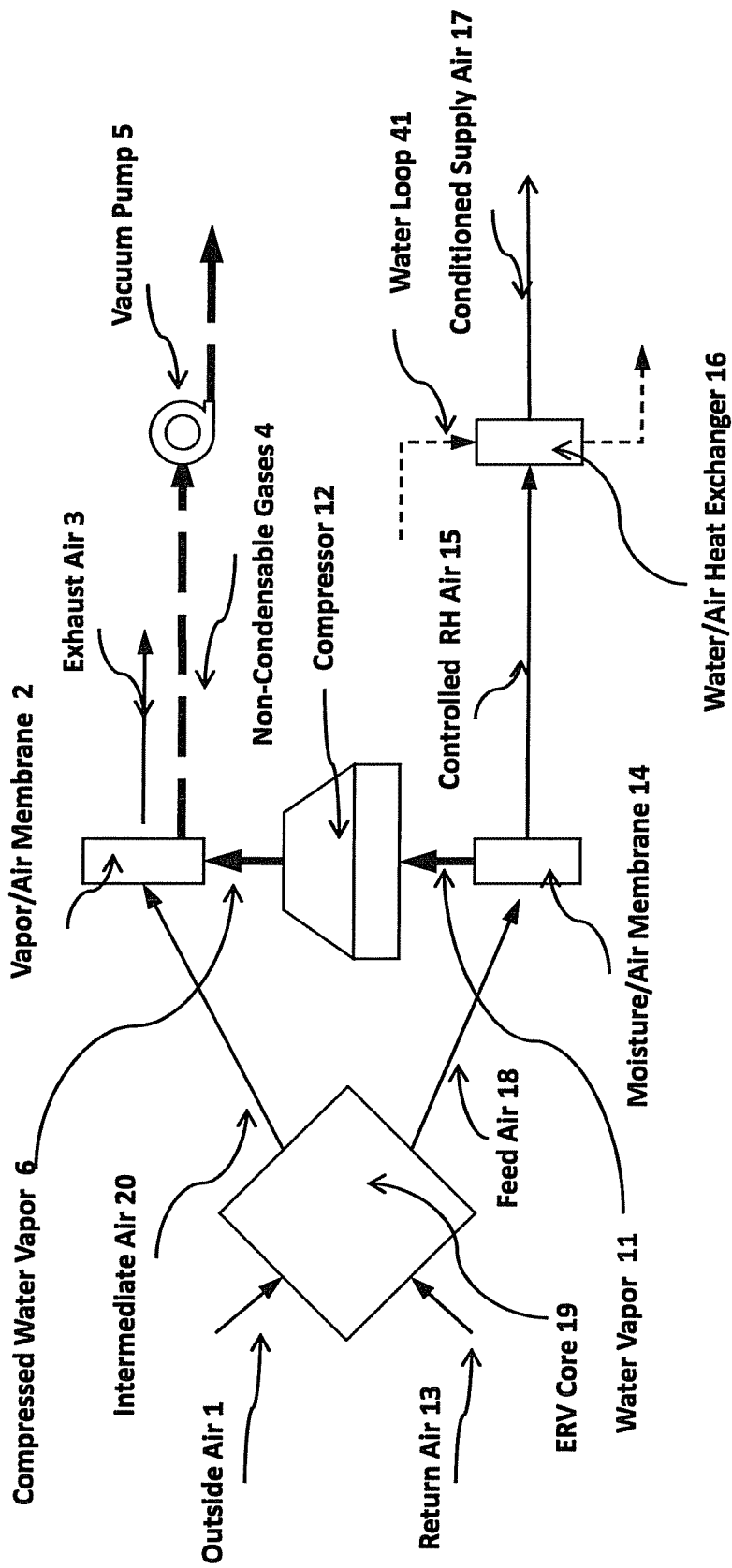
FIG. 7 is a schematic illustration of one embodiment of an exemplary membrane dehumidifier dedicated outdoors air system that uses an external chiller.

Stand Alone Dehumidification System as Illustrated in FIG. 7

FIG. 7 illustrates a system similar to those described in other examples, except that it shows a DOAS system that has only a dehumidification function, moisture/air membrane 14. The system uses a chilled water coil, water/air heat exchanger 16, to remove the sensible heat cooling the air. The chilled water coil is fed from a remote stand-alone chiller using water loop 41. Water loop 41 can be attached to any cold water source.

Example 5

Stand-Alone Evaporative Chiller as Illustrated in FIG. 8

The use of a selective mass exchanger as a chiller is also useful in a stand-alone application to create chilled water or other cold liquids. A large number of HVAC and industrial applications depend on a vapor compression cycle to transfer heat from a process liquid to a working fluid, which can be circulated to another location before dissipating the excess thermal energy. Usually, the working fluid transfers heat sensibly through the walls of a heat exchanger to a heat sink. That heat sink can be ambient air, deep ocean water, geothermal temperature differences, or an evaporating liquid that dissipates the heat as it vaporizes. Typically, the vapor compression device is referred to as a chiller, while the heat dissipation device is referred to as a cooling tower.

FIG. 8 illustrates a system similar to those described in other examples, except that it shows that a selective mass exchanger can use the process fluid as the working fluid and cool the fluid by evaporating mass into a closed region of low pressure vapor. The vapor can then be compressed and moved at a higher pressure to a second selective mass exchanger, where the vapor can be transferred to the ambient conditions.

FIG. 2 shows one possible structure for a chiller using tubular membrane structures. Other non-tubular structures are feasible such as prismatic plate and spiral. Water is absorbed into the membrane though water/transfer surfaces 24. The tubular structure of water transfer surfaces 24 contains a vacuum distributed by vacuum header 21. which is adjacent to the second surface of the water transfer surfaces 24. Warm water 25 is adjacent to water transfer surfaces 24. Water is absorbed into the membrane surface and selectively permeates to the second surface, where it undergoes a phase change to gas and is drawn away into the vacuum header 21. This phase change cools the membrane and the water adjacent to the first surface of the membrane producing cold water 26. The cold water is circulated to the chiller coil such as water/air heat exchanger 16 in FIG. 4.

Example 6

Figure 9:
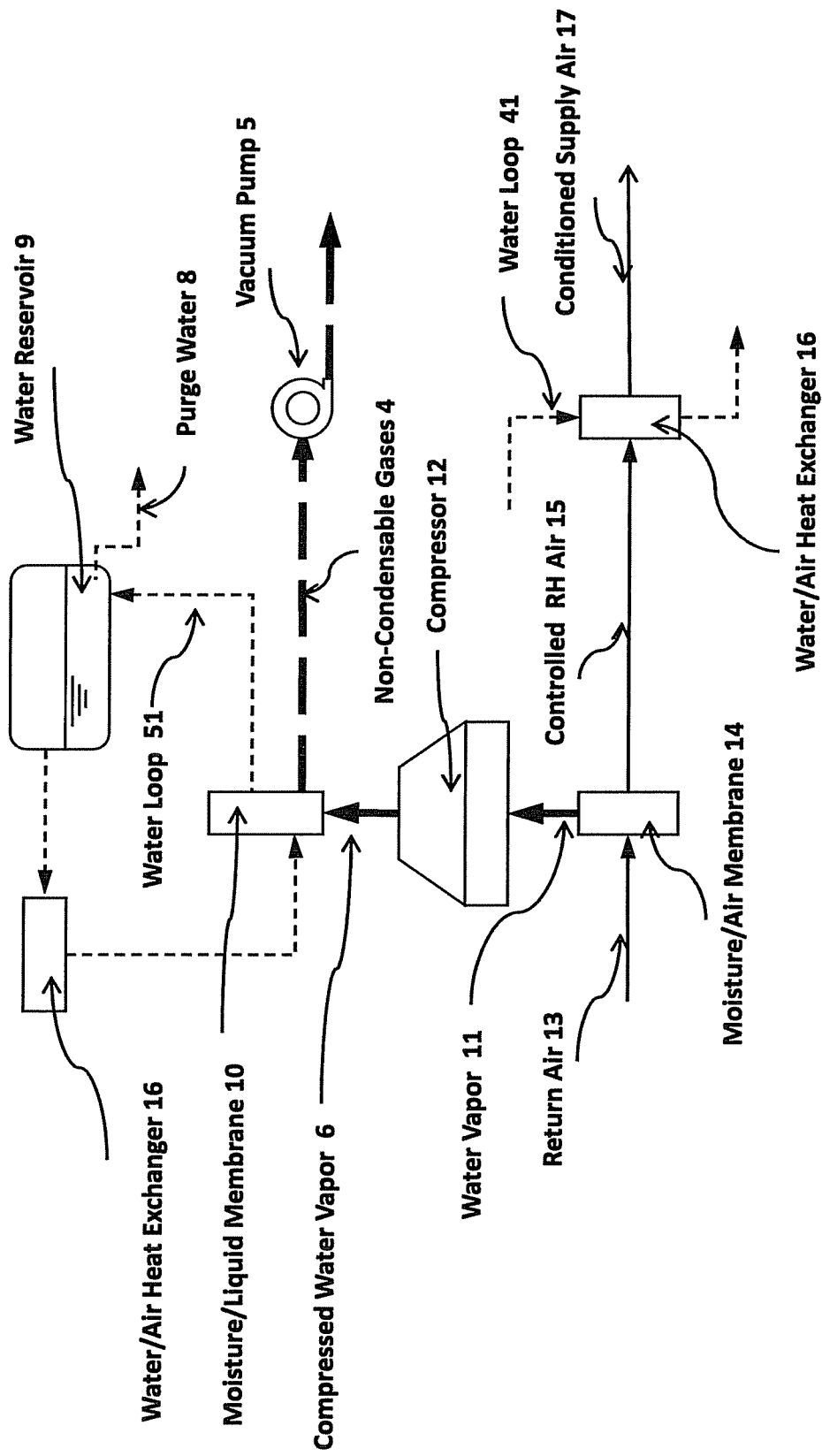
FIG. 9 is a schematic illustration of one embodiment of an exemplary water cooled membrane dehumidifier.

Membrane Dehumidifier (Water Cooled) as Illustrated in FIG. 9

There are applications where it is preferable to use the water-cooled expirator described above in place of the air-cooled expirator in Example 1 and Example 5. Examples include but are not limited to situations where there is a liquid easily available at a temperature below the wetbulb temperature of the ambient air or situations where it is desirable to create fresh water for additional usage.

In these cases, a water loop 51 can be substituted for the air flow through the expirator, moisture/liquid membrane 10. The compressor 12 can pressurize the vapor until its vapor pressure exceeds that of the cool fluid in the expirator. The water molecules transferring through the membrane can raise the fluid temperature as they condense, so the water circulates through a water/air heat exchanger 16 to reject that heat to the environment. There are many viable methods of rejecting that heat, for example, a ground loop may dump the energy into the earth, ambient air may be used to cool the water, the heat may be used in an industrial process such as preheating water, or any number of methods not described here. The process results in a net gain of water molecules in the reservoir, so the process produces clean water. The overall process is shown in FIG. 9, which is similar to systems described in other examples.

One side note to this application is that, in certain embodiments, the water created by the process can be more important than the dehumidification effect at the opposite end. In some applications, industrial or otherwise, this system could be used to draw portable water from the ambient air or another source and inject that portable water into the fluid passing through the expirator (which could be anything from pure distilled water to a mixture of water with other components). Water brought into the fluid by this method would be portable, making this a viable source for certain needs in the water market.

Another aspect of the application shown in FIG. 9 is that the closed water loop shown can be modified for once-through flow. In that sense the water/air heat exchanger 16 and reservoir 9 are essentially replaced by a water supply and removal system that brings a steady stream of cool water to the expirator and then disposes of that water after it has been heated and enlarged by the additional water molecules.

Example 7

Figure 10:
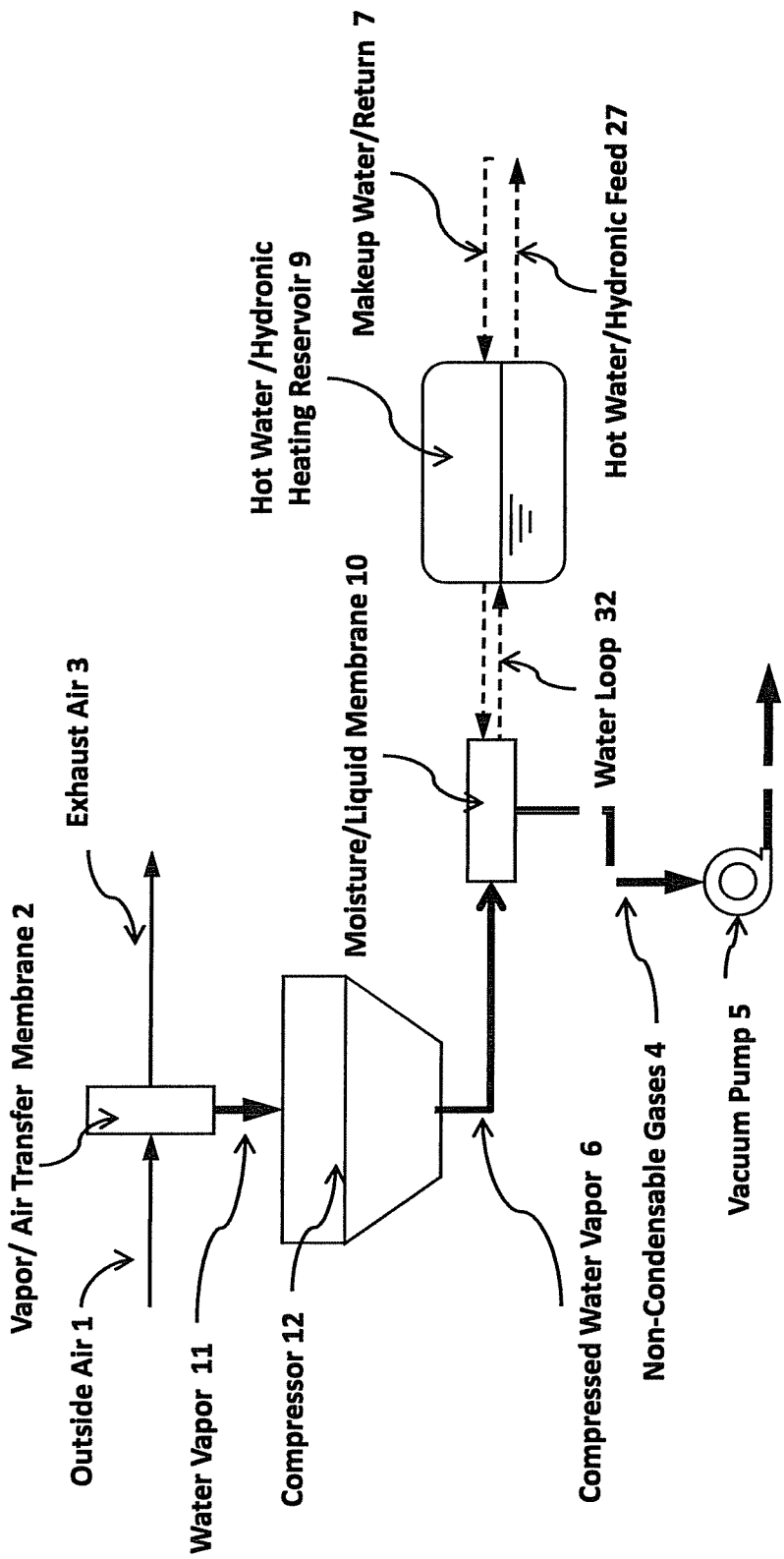
FIG. 10 is a schematic illustration of one embodiment of an exemplary membrane hydronic heating or portable hot water system.

Stand Alone Heat Pump Hydronic System as Illustrated in FIG. 10

FIG. 10 illustrates a system similar to those described in other examples, except that it shows a standard heat pump configuration where the moisture/liquid membrane 10 mass exchanger is connected directly to water reservoir 9. As the system causes moisture to be absorbed into the first surface of the selective transfer membrane, the membrane heats up. The hot water is desorbed from the second surface of the membrane and is transferred by water loop 13 to the reservoir 9 warming it up. The reservoir water can be pumped to a remote hydronic heat exchanger heating the structure.

Example 8

Figure 11:
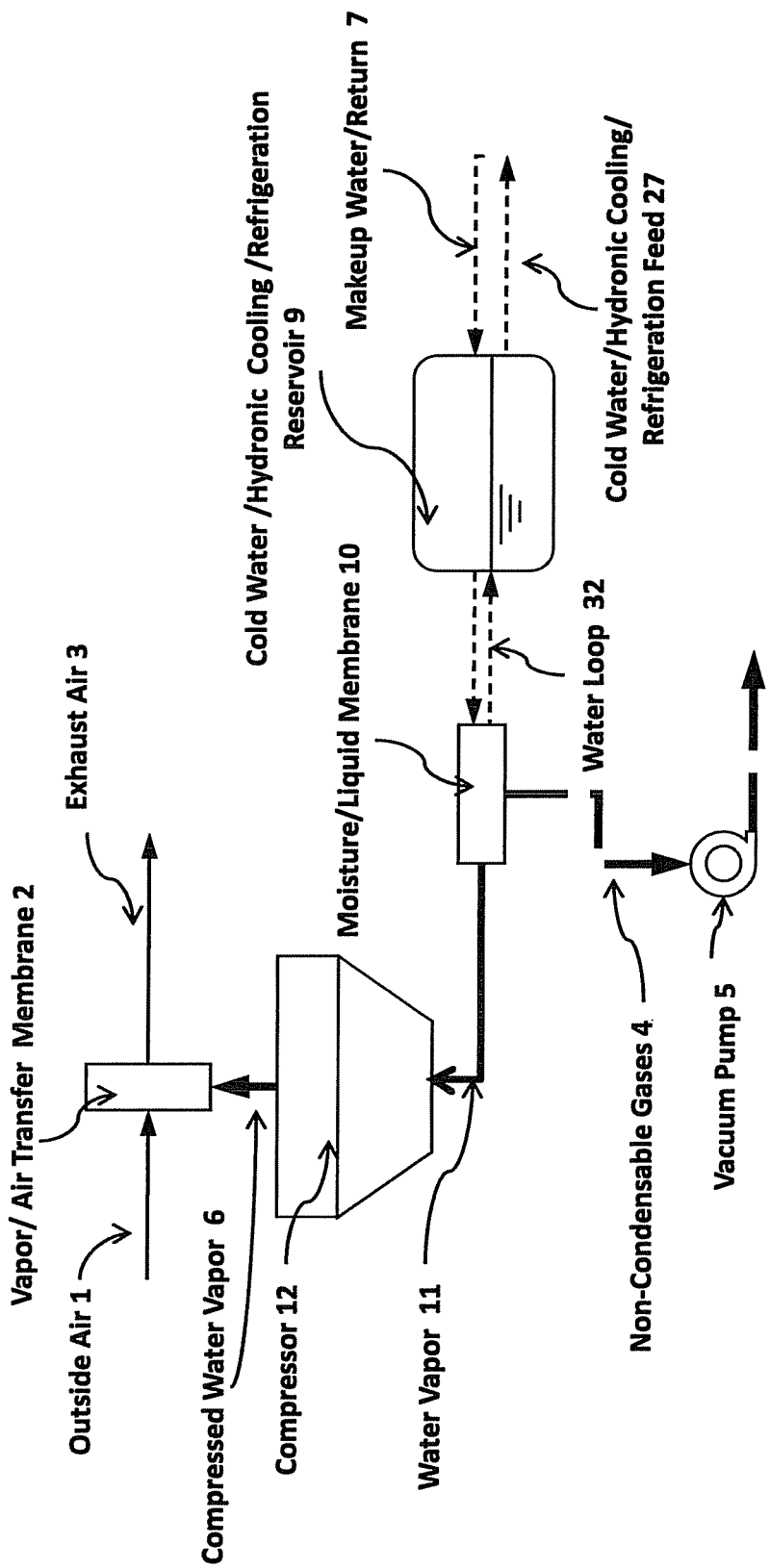
FIG. 11 is a schematic illustration of one embodiment of an exemplary membrane hydronic cooling or refrigeration system.

Stand Alone Hydronic Cooling or Refrigeration System as Illustrated in FIG. 11

FIG. 11 illustrates a system similar to that shown in FIG. 10, except that it shows a standard air conditioning configuration where the moisture liquid membrane 10 mass exchanger is connected directly to water reservoir 9. As the system causes moisture to be desorbed from the first surface of the selective transfer membrane, the membrane cools down. The cold membrane causes water in contact with the second surface of the membrane to cool down and is transferred by water loop 32 to the reservoir 9 cooling it down. The reservoir water can be pumped to a remote hydronic heat exchanger cooling the structure. This example can be extended to refrigeration. The control of the water vapor pressure in contact with the first surface of the membrane sets the temperature of the membrane and the water in contact with the second surface of the membrane. The temperature range of the membrane can extended to the freezing point of water and below, making the system suitable for refrigeration. If working liquid temperatures below the freezing point of water are required in reservoir 9, additives such as anti-freeze can be added to the liquid, and optionally reservoir 9 can be insulated.

Example 9

Figure 12:
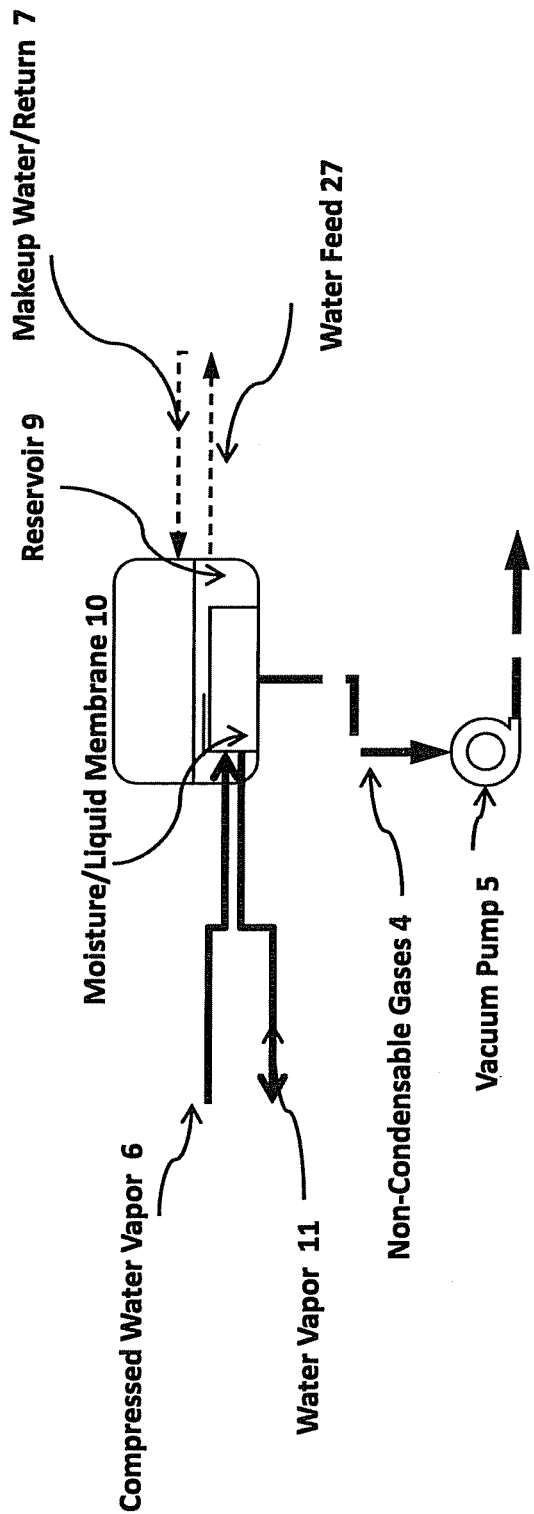
FIG. 12 is a schematic illustration of one embodiment of combining a moisture/liquid membrane and liquid reservoir into a signal component.

Combination of Reservoir 9 and Moisture/Liquid Membrane 10 as Illustrated in FIG. 12

FIG. 12 illustrates a system similar to those described in other examples, and illustrates that the combination of the membrane structure and the reservoir can either heat or cool the water flowing through it, e.g., either accepting compressed water vapor for heating or removing water vapor for cooling. FIG. 12 shows the combination of reservoir 9 and moisture/liquid membrane into one mechanism. This combination can eliminate water loops as was illustrated, for example, in FIGS. 4, 5, 6, and 8 (water loop 31) and FIGS. 10 and 11 (water loop 32). The elimination of water loops can make all systems that utilize such as combination more energy efficient as the parasitic loss of energy to make the water flow within the loop and the heat loss or gain from the environment that water loop engenders. The system can be configured to either accept compressed water vapor for the heating the water flowing through the reservoir or removing water vapor for cooling the water flowing through the reservoir. The external connections to combined Moisture/Liquid Membrane and Reservoir will change according to the its function.

Example 10

Figure 13:
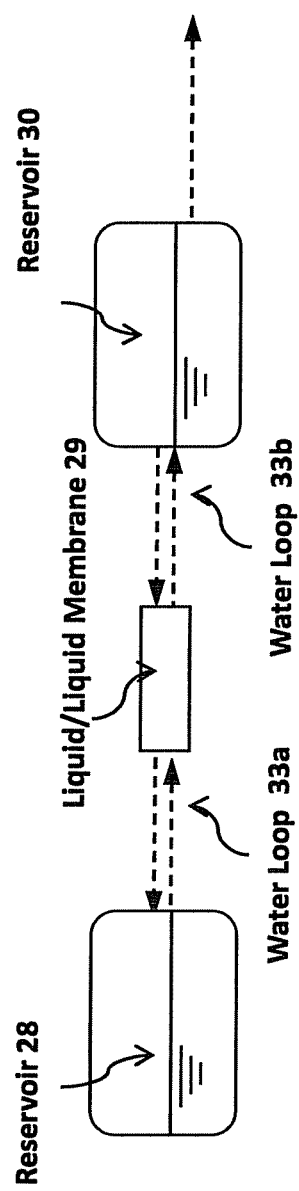
FIG. 13 is a schematic illustration of one embodiment of an exemplary membrane forward osmosis system.

Liquid to Liquid Forward Osmosis as Illustrated in FIG. 13

Expanding upon Example 6 and Example 7 where moisture vapor was transferred to liquid in contact with the second surface of the membrane, the selective membrane is able to transfer liquid components from one liquid stream to a second liquid stream based upon a concentration difference of the component between the two liquid streams. Shown in FIG. 13 are two liquid loops 33a and 33b. Liquid loop 33a is adjacent to the first surface of the selective transfer membrane 29 while liquid loop 33b is adjacent to the second surface of the membrane. If reservoir 28 has a higher concentration of a selected component (i.e. water) than reservoir 30, the selected component will transfer across the membrane and be deposited in reservoir 30 until the concentration of the selected component is equal between the two reservoirs. The other components in the liquids within the reservoirs are not transferred. This forward osmosis property is particularly useful where one reservoir is losing water and concentrating the other components in the reservoir. It is possible to add pure water to that reservoir without adding other components. An example of this would be where reservoir 28 is functioning as the reservoir 9 in FIG. 8. The water loss is concentrating the dissolved components in reservoir 9. Adding embodiments illustrated in FIG. 13 to FIG. 9 could eliminate the purge water cycle by keeping the concentration of components at a constant level. Another example is the form of FIG. 11 where the Hydronic heating system has antifreeze and anticorrosion components. Water can be added to the reservoir without disturbing the concentration of the other components to make up for system loses. This can reduce or eliminate the need for a purge cycle to remove the contents of the reservoir when they become too concentrated and can reduce or eliminate the need for the environmentally difficult deposal of reservoir contents, which may be toxic at high concentrations.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method for independently cooling and dehumidifying air, the method comprising:

providing a flow of humid air through a dehumidifier to provide separated water vapor and a flow of dehumidified air, wherein the dehumidifier comprises a first selective transfer membrane configured for an inflow of the humid air adjacent a first surface of the first membrane under conditions sufficient to allow water vapor to be transported through the first membrane to a second surface of the first membrane to provide the separated water vapor adjacent the second surface of the first membrane and an outflow of the dehumidified air adjacent the first surface of the first membrane;

providing a flow of uncooled air through a cooler to provide a flow of cooled air, wherein the cooler comprises a heat exchanger for cooling using a cooled aqueous liquid and configured for an inflow of uncooled air flowing through the exchanger, resulting in warmed liquid and an outflow of the cooled air, and wherein the heat exchanger is configured for flowing the warmed liquid to a chiller, wherein the chiller comprises a second selective transfer membrane configured for an inflow of the warmed liquid adjacent a first surface of the second membrane under conditions sufficient to allow water vapor to be transported through the second membrane to a second surface of the second membrane to provide the separated water vapor adjacent the second surface of the second membrane and an outflow of cooled liquid adjacent the first surface of the second membrane; and pressurizing the separated water vapor for removal through an expirator, wherein the expirator comprises a third selective transfer membrane configured for flowing the separated water vapor adjacent a first surface of the third membrane under conditions sufficient to allow at least a portion of the water vapor to be transported through the third membrane to a second surface of the third membrane.

2. The method of claim 1 further comprising replenishing water in the aqueous liquid used in the heat exchanger by transferring water from a second aqueous liquid using a fourth selective transfer membrane, wherein the concentration of water in the second aqueous liquid adjacent a first surface of the fourth membrane is sufficiently higher than the concentration of water in the heat exchanger aqueous liquid adjacent a second surface of the fourth membrane to cause forward osmosis of water from the first surface of the fourth membrane to the second surface of the fourth membrane while substantially limiting the transfer of other components of the second aqueous liquid adjacent the first surface of the fourth membrane to the second surface of the fourth membrane, thereby increasing the concentration of water in the heat exchanger aqueous liquid adjacent the second surface of the fourth membrane.

3. The method of claim 2 wherein the difference in water concentration between the first and second surfaces of the fourth membrane results from a thermal gradient that increases the partial pressure of the water.

4. The method of claim 3 wherein the thermal gradient is induced by capturing environmental temperature differences selected from the group consisting of solar heat sources, geothermal heat, and waste heat rejection.

5. The method of claim 2 wherein the second aqueous liquid further comprises antifreeze.

6. The method of claim 2 wherein the second aqueous liquid further comprises dissolved salts and/or minerals.

7. A system for independently cooling and dehumidifying air, the system comprising:
  a dehumidifier configured to provide a flow of humid air through the dehumidifier to provide separated water vapor and a flow of the dehumidified air, wherein the dehumidifier comprises a first selective transfer membrane configured for an inflow of the humid air adjacent a first surface of the first membrane to allow water vapor to be transported through the first membrane to a second surface of the first membrane to provide the separated water vapor adjacent the second surface of the first membrane and an outflow of the dehumidified air adjacent the first surface of the first membrane;
  a cooler configured to provide a flow of uncooled air through the cooler to provide a flow of cooled air, wherein the cooler comprises a heat exchanger for cooling using a cooled aqueous liquid and configured for an inflow of uncooled air flowing through the exchanger, resulting in warmed liquid and an outflow of the cooled air, and wherein the heat exchanger is configured for flowing the warmed liquid to a chiller, wherein the chiller comprises a second selective transfer membrane configured for an inflow of the warmed liquid adjacent a first surface of the second membrane to allow water vapor to be transported through the second membrane to a second surface of the second membrane to provide the separated water vapor adjacent the second surface of the second membrane and an outflow of cooled liquid adjacent the first surface of the second membrane; and
  an expirator configured to pressurize and move the separated water vapor through the expirator, wherein the expirator comprises a third selective transfer membrane configured for flowing the separated water vapor adjacent a first surface of the third membrane to allow at least a portion of the water vapor to be transported through the third membrane to a second surface of the third membrane.

8. A method for independently cooling and separating a component from a fluid, the method comprising:
  providing a flow of a fluid having a first component through a separator to provide the separated first component and a flow of the fluid having at least a portion of the first component removed, wherein the separator comprises a first selective transfer membrane configured for an inflow of the fluid having the first component adjacent a first surface of the first membrane under conditions sufficient to allow at least a portion of the first component to be transported through the first membrane to a second surface of the first membrane to provide the separated first component adjacent the second surface of the first membrane and an outflow of the fluid having at least a portion of the first component removed adjacent the first surface of the first membrane;
  providing a flow of uncooled fluid through a cooler to provide a flow of cooled fluid, wherein the cooler comprises a heat exchanger for cooling using a cooled liquid having a second component and configured for an inflow of uncooled fluid flowing through the exchanger, resulting in warmed liquid and an outflow of the cooled fluid, and wherein the heat exchanger is configured for flowing the warmed liquid to a chiller, wherein the chiller comprises a second selective transfer membrane configured for an inflow of the warmed liquid having the second component adjacent a first surface of the second membrane under conditions sufficient to allow at least a portion of the second component to be transported through the second membrane to a second surface of the second membrane to provide the separated second component adjacent the second surface of the second membrane and an outflow of cooled liquid adjacent the first surface of the second membrane; and
  pressurizing and moving the separated first and/or second components through an expirator, wherein the expirator comprises a third selective transfer membrane configured for flowing the separated components adjacent a first surface of the third membrane under conditions sufficient to allow at least a portion of the first and/or second components to be transported through the second membrane to a second surface of the second membrane.

9. The method of claim 8 wherein the fluid having the first component is air and the first component is water.

10. The method of claim 9 wherein the separated water is water vapor.

11. The method of claim 8 wherein the liquid is an aqueous liquid having water as the second component.

12. The method of claim 11 wherein the separated second component is water vapor.

13. A system for independently cooling and separating a component from a fluid, the system comprising:
  a separator configured to provide a flow of a fluid having a first component through the separator to provide the separated first component and a flow of the fluid having at least a portion of the first component removed, wherein the separator comprises a first selective transfer membrane configured for an inflow of the fluid having the first component adjacent a first surface of the first membrane to allow at least a portion of the first component to be transported through the first membrane to a second surface of the first membrane to provide the separated first component adjacent the second surface of the first membrane and an outflow of the fluid having at least a portion of the first component removed adjacent the first surface of the first membrane;
  a cooler configured to provide a flow of uncooled fluid through the cooler to provide a flow of cooled fluid, wherein the cooler comprises a heat exchanger for cooling using a cooled liquid having a second component and configured for an inflow of uncooled fluid flowing through the exchanger, resulting in warmed liquid and an outflow of the cooled fluid, and wherein the heat exchanger is configured for flowing the warmed liquid to a chiller, wherein the chiller comprises a second selective transfer membrane configured for an inflow of the warmed liquid having the second component adjacent a first surface of the second membrane to allow at least a portion of the second component to be transported through the second membrane to a second surface of the second membrane to provide the separated second component adjacent the second surface of the second membrane and an outflow of cooled liquid adjacent the first surface of the second membrane; and an expirator configured to pressurize and move the separated first and/or second components through the expirator, wherein the expirator comprises a third selective transfer membrane configured for flowing the separated components adjacent a first surface of the third membrane to allow at least a portion of the first and/or second components to be transported through the third membrane to a second surface of the third membrane.

14. The system of claim 13 wherein the fluid having the first component is air and the first component is water.

15. The system of claim 14 wherein the separated water is water vapor.

16. The system of claim 13 wherein the liquid is an aqueous liquid having water as the second component.

17. The system of claim 16 wherein the separated second component is water vapor.

18. A method for cooling a fluid, the method comprising:
providing a flow of uncooled fluid having a component through a chiller to provide a flow of cooled fluid, wherein the chiller comprises a first selective transfer membrane configured for an inflow of the uncooled fluid having the component adjacent a first surface of the first membrane under conditions sufficient to allow at least a portion of the component to be transported through the first membrane to a second surface of the first membrane to provide the separated component adjacent the second surface of the first membrane and an outflow of cooled fluid adjacent the first surface of the first membrane; and pressurizing and moving the separated component through an expirator, wherein the expirator comprises a second selective transfer membrane configured for flowing the separated component adjacent a first surface of the second membrane under conditions sufficient to allow at least a portion of the component to be transported through the second membrane to a second surface of the second membrane.

19. The method of claim 18 wherein the fluid is an aqueous fluid and the component is water.

20. The method of claim 19 wherein the separated water is water vapor.

21. A system for cooling a fluid, the system comprising:
a chiller configured to provide a flow of uncooled fluid having a component through the chiller to provide a flow of cooled fluid, wherein the chiller comprises a first selective transfer membrane configured for an inflow of the uncooled fluid having the component adjacent a first surface of the first membrane to allow at least a portion of the component to be transported through the first membrane to a second surface of the first membrane to provide the separated component adjacent the second surface of the first membrane and an outflow of cooled fluid adjacent the first surface of the first membrane; and an expirator configured to pressurize and move the separated component through the expirator, wherein the expirator comprises a second selective transfer membrane configured for flowing the separated component adjacent a first surface of the second membrane to allow at least a portion of the component to be transported through the second membrane to a second surface of the second membrane.

22. The system of claim 21 wherein the fluid is an aqueous fluid and the component is water.

23. The system of claim 22 wherein the separated water is water vapor.

* * * * *